United States Patent
Jain et al.

(10) Patent No.: US 9,983,775 B2
(45) Date of Patent: May 29, 2018

(54) DYNAMIC USER INTERFACES BASED ON MULTIPLE DATA SOURCES

(71) Applicant: Vignet Incorporated, Fairfax, VA (US)

(72) Inventors: Praduman Jain, Fairfax, VA (US); Josh Schilling, Salem, OR (US)

(73) Assignee: Vignet Incorporated, Fairfax, VA (US)

(*) Notice: Subject to any disclaimer, the term of this patent is extended or adjusted under 35 U.S.C. 154(b) by 0 days. days.

(21) Appl. No.: 15/067,046

(22) Filed: Mar. 10, 2016

(65) Prior Publication Data
US 2017/0262164 A1    Sep. 14, 2017

(51) Int. Cl.
| | |
|---|---|
| G06F 3/0484 | (2013.01) |
| G06F 3/0482 | (2013.01) |
| G06F 8/38 | (2018.01) |
| G06F 9/451 | (2018.01) |
| H04N 1/00 | (2006.01) |
| G06F 9/44 | (2018.01) |

(52) U.S. Cl.
CPC ........ *G06F 3/04847* (2013.01); *G06F 3/0482* (2013.01); *G06F 3/04842* (2013.01); *G06F 8/38* (2013.01); *G06F 9/451* (2018.02); *H04N 1/00501* (2013.01); *H04N 1/00506* (2013.01); *H04N 1/00509* (2013.01); *H04N 1/00511* (2013.01); *H04N 1/00514* (2013.01); *H04N 1/00517* (2013.01)

(58) Field of Classification Search
CPC ........... H04N 1/00501; H04N 1/00506; H04N 1/00509; H04N 1/00511; H04N 1/00514; H04N 1/00517; G06F 3/0482; G06F 3/04842; G06F 3/04847; G06F 8/38; G06F 9/451

USPC .................................................. 715/744–747
See application file for complete search history.

(56) References Cited

U.S. PATENT DOCUMENTS 6,039,688 A    3/2000  Douglas et al.
6,260,022 B1   7/2001  Brown
(Continued)

FOREIGN PATENT DOCUMENTS

EP    2 545 468       3/1951
WO    WO 2011/112556  9/2011

OTHER PUBLICATIONS

Final Office Action in U.S. Appl. No. 15/040,635, dated Apr. 13, 2017, 13 pages.
(Continued)

*Primary Examiner* — Abdullah Al Kawsar
*Assistant Examiner* — David S Posigian
(74) *Attorney, Agent, or Firm* — Fish & Richardson P.C.

(57) ABSTRACT

In some implementations, a user interface is adjusted using a set of customization rules and displayed on a user device. A first subset of customization rules is selected from among a set of customization rules that is associated with an application on a user device. A user interface is generated based at least on the selected first set of customization rules. After generating the user interface, user interaction data is received, and sensor data from the user device is also received. A second subset of customization rules is selected that includes one or more rules different from the first subset of customization rules. The user interface is adjusted according to the selected second subset of customization rules and provided for display on the user device.

21 Claims, 15 Drawing Sheets

(56) References Cited

U.S. PATENT DOCUMENTS

| | | |
|---|---|---|
| 6,269,339 B1 | 7/2001 | Silver |
| 6,828,992 B1 | 12/2004 | Freeman |
| 6,904,408 B1 | 6/2005 | McCarthy |
| 7,076,534 B1 | 7/2006 | Cleron et al. |
| 7,086,007 B1 | 8/2006 | Bushey |
| 7,330,717 B2 | 2/2008 | Gidron et al. |
| 8,019,777 B2 | 9/2011 | Hauser |
| 9,361,011 B1 | 6/2016 | Burns |
| 9,426,433 B1 | 8/2016 | Mazzarella |
| 9,461,972 B1 | 10/2016 | Mehta |
| 2001/0019338 A1* | 9/2001 | Roth ............... G06F 3/0482 715/811 |
| 2002/0022973 A1 | 2/2002 | Sun |
| 2004/0216054 A1 | 10/2004 | Mathews |
| 2005/0086587 A1 | 4/2005 | Balz |
| 2005/0186550 A1 | 8/2005 | Gillani |
| 2005/0246304 A1 | 11/2005 | Knight et al. |
| 2006/0107219 A1* | 5/2006 | Ahya ............... G06F 9/465 715/745 |
| 2006/0205564 A1 | 9/2006 | Peterson |
| 2007/0021984 A1 | 1/2007 | Brown |
| 2008/0005679 A1* | 1/2008 | Rimas-Ribikauskas ...... G01C 21/3688 715/745 |
| 2008/0127040 A1 | 5/2008 | Barcellona |
| 2008/0177638 A1 | 7/2008 | Butler |
| 2008/0201174 A1 | 8/2008 | Ramasubramanian |
| 2008/0301118 A1 | 12/2008 | Chien |
| 2009/0024944 A1* | 1/2009 | Louch ............... G06F 3/04817 715/765 |
| 2009/0043689 A1 | 2/2009 | Yang |
| 2009/0049389 A1* | 2/2009 | Kuzmanovic ......... G06F 9/4443 715/745 |
| 2009/0076856 A1 | 3/2009 | Darby et al. |
| 2009/0150814 A1 | 6/2009 | Eyer |
| 2009/0163182 A1* | 6/2009 | Gatti ............... G06F 9/4443 455/414.1 |
| 2009/0172002 A1 | 7/2009 | Bathiche |
| 2010/0041378 A1* | 2/2010 | Aceves ............... H04L 67/306 455/414.1 |
| 2010/0122286 A1 | 5/2010 | Begeja |
| 2010/0179833 A1 | 7/2010 | Roizen et al. |
| 2010/0333037 A1 | 12/2010 | Pavlovski |
| 2011/0126119 A1* | 5/2011 | Young ............... G06F 17/30905 715/744 |
| 2011/0200979 A1 | 8/2011 | Benson |
| 2012/0102050 A1* | 4/2012 | Button ............... G06N 5/043 707/749 |
| 2012/0215639 A1 | 8/2012 | Ramer et al. |
| 2012/0260294 A1 | 10/2012 | Reichardt et al. |
| 2012/0272156 A1* | 10/2012 | Kerger ............... H04M 3/487 715/747 |
| 2013/0110565 A1 | 5/2013 | Means |
| 2013/0145457 A1 | 6/2013 | Papkipos et al. |
| 2013/0166494 A1* | 6/2013 | Davis ............... G06N 5/04 706/54 |
| 2013/0212487 A1 | 8/2013 | Cote |
| 2013/0238686 A1* | 9/2013 | O'Donoghue ......... G06Q 30/02 709/203 |
| 2014/0088995 A1 | 3/2014 | Damani |
| 2014/0100883 A1 | 4/2014 | Hamilton |
| 2014/0156823 A1 | 6/2014 | Liu |
| 2014/0181715 A1* | 6/2014 | Axelrod ............... G06F 3/0487 715/771 |
| 2014/0240122 A1 | 8/2014 | Roberts |
| 2014/0273913 A1 | 9/2014 | Michel |
| 2014/0282061 A1 | 9/2014 | Wheatley et al. |
| 2014/0309868 A1 | 10/2014 | Ricci |
| 2015/0019342 A1 | 1/2015 | Gupta |
| 2015/0056589 A1 | 2/2015 | Zhang et al. |
| 2015/0135160 A1 | 5/2015 | Gauvin |
| 2015/0148061 A1 | 5/2015 | Koukoumidis |
| 2015/0154002 A1 | 6/2015 | Weinstein et al. |
| 2016/0058287 A1 | 3/2016 | Dyell |

OTHER PUBLICATIONS

Final Office Action in U.S. Appl. No. 15/152,411, dated Mar. 17, 2017, 17 pages.
http://www.khanacademic.org, 2017, 1 page.
Non-Final Office Action in U.S. Appl. No. 15/040,635, dated Dec. 30, 2016, 11 pages.
Non-Final Office Action in U.S. Appl. No. 15/040,635, dated Jul. 8, 2016, 9 pages.
Non-Final Office Action in U.S. Appl. No. 15/152,411, dated Dec. 7, 2016, 10 pages.
Non-Final Office Action in U.S. Appl. No. 15/279,845, dated Apr. 21, 2017, 10 pages.
Non-Final Office Action in U.S. Appl. No. 15/337,222, dated Mar. 23, 2017, 13 pages.
Non-Final Office Action in U.S. Appl. No. 15/382,126, dated Mar. 17, 2017, 16 pages.
International Search Report and Written Opinion in International Application No. PCT/US2017/021869, dated May 17, 2017, 14 pages.
[No Author] "Methods for JITAIs Just in Time Adaptive Intervention," 2016, Nov. 9, 2016, [retreieved on Nov. 9, 2016], from the internet <https://community.isr.umich.edu/public/Default.aspx?alias=community.isr.umich.edu/public/jitai&>.
Conner, "Experience sampling and ecological momentary assessment with mobile phones," 2015—http://www.otago.ac.nz/psychology/otago047475.pdf.
Heron, "Ecological Momentary Intervention [EMI]: Incorporating mobile technology into a disordered eating treatment program for college women," Psychology—Dissertations, paper 157, 2011.
Milward, "Ecological momentary assessment," Jul. 2015, [retrieved on May 12, 2017], from the internet <https://www.addiction-ssa.org/commentary/emerging-research-methods-series-ecological-momentary-assessment>, 3 pages.
Runyan et al., "Virtues, ecological momentary assessment/intervention and smartphone technology," Front Psychol, 2015;6:481.
West et al., "There's an App for That: Content Analysis of Paid Health and Fitness Apps," J Med Internet Res., May-Jun. 2012, 14(3): e72.

* cited by examiner

162

| CONDITIONS | | | ADJUSTMENT SPECIFICATIONS |
|---|---|---|---|
| USER INPUT | USER BEHAVIOR | USER ATTRIBUTES | |
| SELECT OBJECT | ACTIVITY RELEVANT TO OBJECT | 75 YEAR OLD MALE WITH VISUAL IMPAIRMENT | (1) GENERATE LARGE OBJECT<br>(1) PLACE OBJECT AT TOP<br>(2) SIMPLE CONTENT ARRANGEMENT |
| REMOVE OBJECT | ACTIVITY RELEVANT TO OBJECT | 75 YEAR OLD MALE WITH VISUAL IMPAIRMENT | (1) GENERATE MEDIUM OBJECT<br>(2) PLACE OBJECT IN MIDDLE<br>(3) SIMPLE CONTENT ARRANGEMENT |
| SELECT OBJECT | ACTIVITY NOT RELEVANT TO OBJECT | 75 YEAR OLD MALE WITH VISUAL IMPAIRMENT | (1) GENERATE SMALL OBJECT<br>(2) PLACE OBJECT IN MIDDLE<br>(3) SIMPLE CONTENT ARRANGEMENT |
| REMOVE OBJECT | ACTIVITY NOT RELEVANT TO OBJECT | 75 YEAR OLD MALE WITH VISUAL IMPAIRMENT | (1) GENERATE SMALL OBJECT<br>(2) PLACE OBJECT IN BOTTOM<br>(3) SIMPLE CONTENT ARRANGEMENT |
| SELECT OBJECT | ACTIVITY RELEVANT TO OBJECT | 34 YEAR OLD OVERWEIGHT FEMALE | (1) GENERATE LARGE OBJECT<br>(2) PLACE OBJECT IN MIDDLE<br>(3) MULTI-TASKING CONTENT ARRANGEMENT |

164

| USER CONTEXT | ADJUSTMENT SPECIFICATIONS |
|---|---|
| USER IS AT WORK | PROVIDE TEXT-BASED NOTIFICATIONS |
| USER IS AT HOME | PROVIDE AUDIBLE NOTIFICATIONS |
| USER IS TRAVELING | PROVIDE NOTIFICATIONS RELATED TO NEARBY EVENTS |

DYNAMIC USER INTERFACES BASED ON MULTIPLE DATA SOURCES

FIELD

This specification generally describes technology related to user interfaces.

BACKGROUND

User interfaces enable human-machine interactions on electronic devices. For example, such interactions often include providing information for users based on a user's visual, auditory or kinesthetic learning style while receiving feedback from users. The machine response of some human user interfaces such as displays, sounds and physical methods like vibration can be set based on user preferences.

SUMMARY

User interfaces can sometimes be customized using a set of user selections that indicate user preferences. For instance, user interfaces can be modified to create user experience interactions, variable color schemes, fonts, graphical illustrations, content, and layout of information, sounds, shock, vibration, touch and tactile sensory reaction. However, many customization techniques require a user to actively select from a set of static, predetermined options. In addition, many techniques are unable to make use of extrinsic data that reflect user behavior and thus cannot adapt to a user's changing needs and circumstances.

To provide users an enhanced experience, an application for a mobile device can automatically personalize its interface and content for a user and dynamically adjust the interface and content in response to the user's needs—either passively or actively. In particular, the interface of the application can be adjusted without the user selecting or requesting changes to the interface. The reconfiguration of a user interface may be based on various factors. For example, user interactions with the application and survey responses can be used to determine appropriate interface characteristics. In addition, appropriate changes for the user interface can be inferred from the user's interaction with other applications on the mobile device, conditions sensed by the mobile device, and other user behaviors independent of the application. By automatically and gradually changing a user interface and experience, both based on explicit user input and inferred information about the user, the application can greatly enhance its usefulness to the user.

The adjustments made to the user interface of an application can be performed automatically and without any explicit user action to change the user interface. A variety of information can be used to adjust the user interface, including sensor data, user behavior data, and other information that allow the user's preferences and needs to be inferred without the user specifying them. With this information, the application can iteratively make gradual, unexpected changes that adapt the user interface to the user's personalized needs. In addition, the user can enroll in one or more health programs which support different aspects of the user's wellbeing (e.g., general fitness, diabetes care, smoking cessation, meditation, etc.) Each of these programs may include customization rules that can be selected, when appropriate, to customize the user interface so that the user interface provides information in an appropriate manner for each particular user.

In some implementations, a personalized user model can be used to generate and periodically reconfigure a dynamic interface that adjusts layout and formatting, configures interactive elements, and modifies content displayed to a user as well as required from the user. For example, a dynamic interface reconfiguration process can include three general states: an initialization state, a rule comparison state, and a dynamic reconfiguration state. The initialization state can involve generating and providing a first user interface. The rule comparison state can represent a set of processes that are enabled in response to receiving user information and/or information about passive user behaviors over a period of time. During the rule comparison state, a set of customization rules can be applied to determine whether an interface reconfiguration should be initiated. The interface reconfiguration state can represent a set of processes that customize the interface based on the user information and the passive user behaviors without requiring user selections of interface characteristics.

In one general aspect, a computer-implemented method includes: generating a user profile for a user; providing, at a user device associated with the user, an application that includes a user interface generated based on the user profile; periodically updating the user profile based on behavior information indicating behavior of the user and sensor data collected by the user device of the user; in response to the updates to the user profile, automatically and periodically customizing the user interface of the application based on the updates to the user profile.

In another general aspect, a computer-implemented method includes: selecting a first subset of customization rules from among a predetermined set of customization rules associated with an application on a user device; generating a user interface based at least on the selected first set of customization rules; after generating the user interface: receiving user input data through the generated user interface of the application, and receiving sensor data indicating user behavior data separate from interaction with the application passively or actively; selecting a second subset of customization rules based at least on the user input data and the sensor data indicating user behavior data, where the selected second subset of customization rules includes one or more rules different from the first subset of customization rules; adjusting the user interface according to the selected second subset of customization rules; and providing the adjusted interface for display on the user device.

Other versions of these and other aspects disclosed herein include corresponding devices, systems, and computer programs encoded on computer-readable storage devices that are configured to perform the actions of the methods. These and other aspects may include one or more of the features discussed below.

In some implementations, adjusting the user interface includes altering content that is displayed on the user interface.

In some implementations, adjusting the user interface includes altering an arrangement of content that is displayed on the user interface.

In some implementations, selecting the first subset of customization rules includes: receiving user enrollment information from the user device; generating a user profile based at least on the received user enrollment information; and selecting the first subset of customization rules based at least on the user profile.

In some implementations, the method includes generating an adjusted user profile based at least on the received user interaction data and the sensor data.

In some implementations, selecting the second subset of customization rules includes: comparing one or more portions of the received user interaction data to user information included in the user profile; ranking the one or more portions of the received user interaction data based at least on comparing the received user interaction data to user information included in the user profile; and selecting the second subset of customization rules based at least on the highest ranked portion of the received user input data.

In some implementations, ranking one or more portions of the received user input data further includes: determining a correspondence between the one or more portions of the received user interaction data and received sensor data indicating user behavior of the user; computing a score for each of the one or more portions of the received user interaction data based at least on the determined correspondence between the one or more portions of the received user interaction data and the received sensor data indicating user behavior of the user; and adjusting the rank for the one or more portions of the received user input data based at least on the value of the computed score for each of the one or more portions of the received user interaction data.

In some implementations, selecting the first subset of customization rules from among the set of customization rules includes: selecting the first subset of customization rules from among a predetermined set of customization rules that each (i) specify one or more adjustments or properties to apply to a user interface and (ii) specify one or more conditions when the adjustments should be made.

In some implementations, the method includes: determining a context of the user device based on information received from the user device; and selecting, from among a set of context rules, a context rule corresponding to the determined context of the user device; wherein adjusting the user interface includes: adjusting the user interface according to the selected second subset of customization rules and the selected context rule corresponding to the determined context of the user device.

In some implementations, receiving the sensor data includes receiving sensor data from an accelerometer, a pedometer, a gyroscope, a global positioning system (GPS) sensor, a body-worn sensor, a camera, a microphone, or a light sensor. The user device can be a mobile device, such as a phone, a tablet computer, or a wearable device.

In some implementations, receiving the sensor data includes receiving data from a pulse oximeter, a glucose monitor, a pulse monitor, a blood pressure monitor, a thermometer, a weight scale, an apnea monitor, or a continuous positive air pressure (CPAP) machine.

In some implementations, adjusting the user interface includes adjusting a portion of the user interface so that the portion of the user interface changes in color, size, layout, formatting, font, media type, amount of content, or interactivity of content. The adjustment to the user interface may add, alter, or remove visual, audible, and/or haptic outputs to the user. The adjustment to the user interface may add, alter, or remove sensitivity of the application to receive visual, audible, or haptic inputs from the user.

In some implementations, adjusting the user interface includes adjusting a size, shape, color, font, level of vocabulary or readability, or tone of text content in the user interface.

In some implementations, adjusting the user interface includes adjusting a current view of the application, while the user interface is visible on the client device.

In some implementations, adjusting the user interface includes adjusting the user interface during a session of usage of the application, but while the adjusted view is not visible. For example, the method can include displaying a first portion of an application; after displaying the first portion of the application having a first view, removing the first portion from display and showing a second portion of the application; after displaying the second portion of the application, and on returning to the first portion of the application, displaying an altered view of the first portion of the application.

In some implementations, adjusting the user interface includes adjusting the application between user sessions. For example, the user interface may be adjusted between two sessions of using the application such that after closing the application and reopening the application, the adjusted user interface is displayed in place of the previous user interface displayed during the prior user session.

In some implementations, the user interaction data indicates a pattern of use of the application or user device by the user. The second set of customization rules can be selected based on user interaction data that indicates a frequency or extent of use of the application by the user after the user interface is provided.

In some implementations, the user interface can be adjusted independent of user settings. For example, the adjustment can automatically personalize the user interface for the user indicating that the user interface should be changed. Thus, without explicit user feedback or instruction to change the settings of the application or the user device, the user interface of the application can be customized according to user preferences inferred from user interaction data and sensor data.

In some implementations, the actions of the method are performed by the user device. In some implementations, one or more actions of the method are performed by a server system. The method can include providing the received user interaction data and sensor data to the server system, which maintains a user profile for the user. The server system may select the second set of customization rules and provide the second set of customization rules or user interface data based on the second set of customization rules to the user device, which provides the adjusted user interface.

In some implementations, the method involves repeatedly and automatically making incremental changes to the user interface based on implicit measures of user behavior of the user.

In some implementations, adjusting the user interface includes storing, at the user device information indicating parameters of the adjusted user interface. The adjustment may further include setting the adjusted user interface as a default interface to be used during future sessions of use of the application. In addition, the adjustment may include designating the adjusted user interface as a baseline interface to be further adjusted during a next iteration of a user interface customization process.

In some implementations, generating a user model includes collecting and storing data indicating explicit or inferred user preferences, historical user behavior, and user personality characteristics. The user model can indicate user characteristics, such as a user's age, gender, learning style, psychological state of mind, physical capabilities, demographics, country, language, socio-economic status, or ethnicity. Each of the items indicated by the user profile can be used to tailor the interface for the user. In some implementations, changes to the user model trigger changes to the user interface of the application for that user.

In some implementations, a user model includes electronic medical records or other health information about a user. The user interface can be adjusted based on the electronic medical records or other health information. The manner in which physician appointment reminders, medication reminders, encouragement for health plan compliance, health instruction and information, care plan information, or health surveys are providing on the user interface can be adjusted based on the electronic medical records or other health information.

In some implementations, data used to select customization rules is obtained from third party sources, such as a weather information provider, a health care provider, a fitness device, a vehicle. Information may be requested by the application or provided to the application through one or more application programming interfaces (APIs). In some implementations, data used to select customization rules is obtained from other applications or data storage on the user device, such as notes, messages, calendar items, and contact information databases.

Other aspects and implementations are evident from the description, figures, and claims.

BRIEF DESCRIPTION OF THE DRAWINGS

FIG. 1E is a diagram that illustrates examples of customization rules.

FIGS. 3A-3C are diagrams that illustrate examples of dynamically reconfigured user interfaces.

In the drawings, like reference numbers represent corresponding parts throughout.

DETAILED DESCRIPTION

Figure 1A:
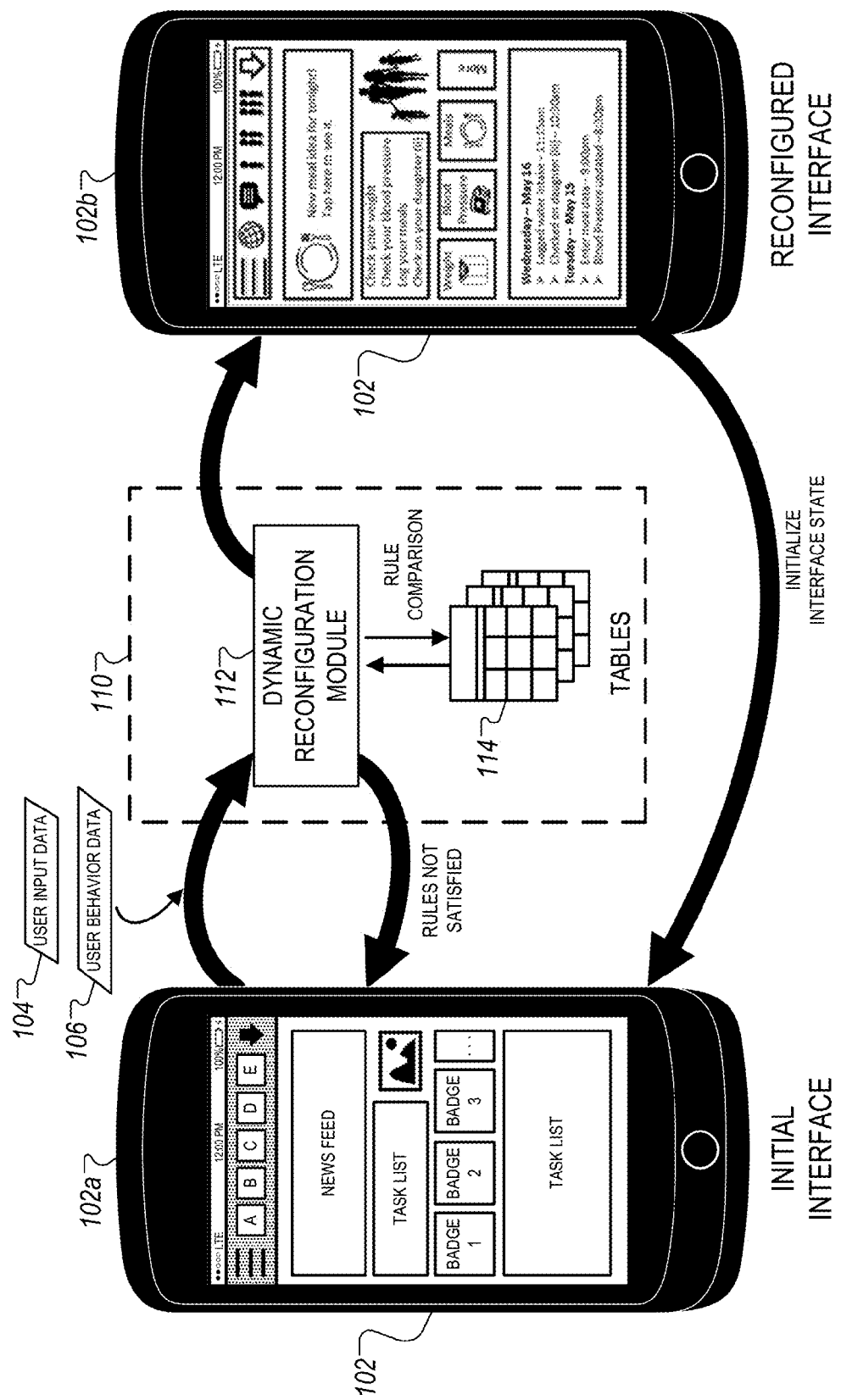
FIG. 1A is a diagram that illustrates an example of user interface reconfiguration.

In general, an application for a mobile device or other device can automatically change its interface to adapt to a user's needs. Without the user making any explicit changes to interface settings, the mobile application and an associated server, either local or remote, can incrementally and gradually change the visual look, audible responses, vibration, haptic outputs, and sensory reception of the application. These changes may occur in response to the user's interaction with the application, as well as response to sensor data indicating user behavior data that is passively sensed from the user's device or data from external sensing devices that are connected to the user's device through wireless connection such as Bluetooth. The changes to the user interfaces allow the application to individually address a user's learning preferences, since different users may respectively prefer visual cues, audible cues, or haptic or tactile cues. A wide variety of interface characteristics may be adapted, for example, the user experience interactions, content, size, shape, position, layout, color, media type, sounds, vibrations, haptic feedback, touch reception, and level of interactivity of graphical elements. Similarly, the size, shape, color, font, level of vocabulary or readability, and tone of text content can also be changed. These and other changes discussed below allow the content provided to the user through the application, and the arrangement and interactivity of that content, to be consistently adapted and personalized for the user. In some implementations, the customization process goes on iteratively and indefinitely.

In some implementations, decisions about how and when to adapt the application's interface may be made using a user model that stores various types of information about a user. For example, the user model may indicate a variety of explicit or inferred user preferences, historical user behavior, and user personality characteristics, among other items. Similarly, the user model can indicate characteristics, like a user's age, gender, learning style (e.g., a user's preference for receiving information in a visual, auditory, or kinesthetic manner, or different levels or combinations of each), psychological state of mind, mental conditions (e.g., mania, bipolar disorder, depression, anxiety, etc.), physical capabilities (e.g., including any disabilities of the user), demographics, country, language, socio economic status and ethnicity that are used to tailor the interface for the user. As additional information about the user is received, the corresponding user model is updated and so is the interface of the application for that user. This can provide a dynamic, continually changing user experience that responds to many different sources of information about the user.

For example, two users may download the same mobile application from an app store. Due to the personalization and dynamic reconfiguration techniques discussed in this document, each may be shown very different user interfaces within the application. For example, even when each user accesses the same functionality of the application, the arrangement and presentation of content may be quite different since the application adapts the interface to each user's personalized needs and context. Over time, as a user's circumstances or preferences change, the mobile application and the associated server can detect these changes and respond accordingly. As a result, the interface of the application may change from one use of the application to the next even for a single user, depending on the user's interaction with the application, the user's behavior independent of the application, and other factors.

In some implementations, user interface reconfiguration techniques can be used in healthcare applications, where the application is used to help the user improve his/her personal wellbeing. For instance, the application can be used to communicate information associated with medical conditions of the user, manage treatment information, or help the user comply with treatment schedules. The personalized user model may include information about many different aspects of the patient's health, allowing the application to customize its interface for any aspect of total body health. As a result, the application can educate and encourage with respect to adjusting and improving diet, exercise, taking medication, and lifestyle decisions to achieve the user's health goals.

In some implementations, a user interface reconfiguration process includes three states: an initialization state, a rule comparison state, and a dynamic reconfiguration state. During the initialization state, a baseline user interface is generated and displayed to a user. This baseline user interface may be a generic or un-customized interface, or the baseline user interface may be one that is customized for the user. The rule comparison state is triggered once a user device or a server system receives user information, such as user input data or user behavior data. During the rule comparison state, received user data is evaluated using a set of rules. If appropriate conditions are satisfied, the dynamic reconfiguration state adjusts the baseline user interface based on the received user information. As discussed below, a variety of user interface characteristics may be adjusted.

The reconfiguration process may be repeated, with the adjusted user interface becoming the new baseline interface for the next reconfiguration. Thus, one or more subsequent user interface reconfigurations can take place after receiving additional user information to further refine the interface and adapt to the user's changing needs. In this regard, user interface reconfiguration can involve a set of successive or ongoing processes that adjust the presentation of information on a user interface. The reconfiguration process may be performed automatically by the user's device and/or a server in communication by the device, without the user providing any explicit request or instruction for the interface to be adjusted.

In general, user interfaces for conventional applications often have the same layout and features for all users who install the application. Frequently, the ability to change the appearance of an application is limited to a small number of options that a user must explicitly select. For these and other reasons, many applications are unable to address the needs of different users, or to address the changing needs of a single user. As a result, many different applications may consume the limited computation and data storage capacity of a mobile device, as users install and run multiple different applications with fixed user interfaces, in an attempt to access various sets of functionality. Additionally, unnecessary redundancy is required in application distribution systems to store, distribute, maintain, and update many different types of applications appropriate for users with different preferences.

The techniques discussed herein may be used avoid many limitations of applications with fixed user interfaces. For example, a single application can be provided to different users, and the user interface can be customized automatically for each user. In some instances, this can conserve resources by reducing or eliminating the need for multiple versions of applications to be created, distributed, and stored. In some implementations, a system can obtain sensor data and user interaction data, and infer preferences of a user from the information. The system can automatically make changes to the user interface, without requiring users to explicitly change user interface settings. This can be done as an iterative process, for example, to change the user interfaces in small ways that are unexpected and incremental, gradually adapting the user interface for a particular user over time.

FIG. 1A is a diagram 100A that illustrates an example of user interface reconfiguration. In the example, a device 102 displays an initial interface 102a of an application prior to user interface reconfiguration, and the device 102 displays an altered interface 102b of the application after user interface reconfiguration. A server 110 communicates with the device 102 to carry out the reconfiguration. The server 110 includes a dynamic reconfiguration module 112 configured to access tables 114 or other data storage that the server 110 uses to determine whether conditions for initiating reconfiguration are satisfied. For instance, the server 110 can receive (i) user input data 104 entered at the device 102 and (ii) user behavior data 106. The server 110 can then compare the data with information in the tables 114 to determine when and how to personalize the interface of the application running on the device 102.

In more detail, the initial interface 102a can include one or more user interface elements such as, for example, a news feed, a task list, graphical information, content management, messages, user sharing, entry selection and/or badges. The content and arrangement of the initial interface 102a, while displayed on the device 102, may be generated by the device 102, by the server 110, or by processing of both the device 102 and the server 110. The user interface elements may be preconfigured by a system, e.g., prior to installation of the application on the device 102, or configured after a previously performed reconfiguration process. For example, in some instances, the elements in the initial interface 102a can be selected and arranged based on user enrollment data that includes general user information. User enrollment data may be obtained during installation of the application on the device 102, during the first use of the application, or when establishing an account for the user. As described more particularly with respect to FIG. 1C, the user enrollment data can include, for example, demographic information, user personality traits, and/or survey responses. For a healthcare application, the user enrollment information may include total body health information, indications of a user's health goals, psychological needs, medical conditions, and so on.

When generated from an initial set of enrollment data, the initial interface 102a may represent a system-configured interface that is displayed for the first use of the application. In other instances, the initial interface 102a can represent an interface that has been reconfigured one or more times after the initial use. For example, after generating the reconfigured interface 102b, a system can designate the reconfigured interface 102b to be used as the initial interface 102a for a subsequent interface reconfiguration process to be performed after receiving additional user input data 104 and user behavior data 106.

Once the interface 102a is generated, user input data 104 and user behavior data 106 can be generated or received by the user device 102. The user input data 104 can indicate various types of user input such as, for example, text queries, voice queries, user selections, user submissions, user controlled and driven sensors both remote or locally connected, or other types of input data. In some implementations, the user input data 104 indicates interaction with elements of the interface 102a, for example, text entered, identification of buttons or other controls a user interacted, sequences of interactions, video or audio that the user caused to be played, and so on. In some instances, the user input data 104 may indicate input entered to other applications or to an operating system of the device 102. The user behavior data 106 can include contextual information associated with the user such as, for example, location and positioning information, nearby advertisement signs, elevation, direction, application usage, and/or other types of user behaviors and patterns. As another example, for a healthcare application, the user behavior data may indicate sensor data, such as accelerometer data that indicates exercise, generated while the healthcare application is active or not active. The user input data 104 and the user behavior 106 is then transmitted to the dynamic reconfiguration module 112 of the server 110.

After receiving the user input data 104 and the user behavior data 106, the dynamic reconfiguration module 112 of the server 110 can access the tables 114 and perform a set of rule comparison operations. For instance, as described more particularly with respect to FIGS. 2A-2E, the lookup tables can store customization rules, each of which is associated with one or more conditions indicating when the rule is applicable. By comparing the user input data 104 and the user behavior data 106 to the conditions for the various rules, the dynamic reconfiguration module 112 can determine whether the conditions for applying one or more customization rules are satisfied.

If the dynamic reconfiguration module 112 determines that the customization rules specified within the lookup tables are not satisfied, then an interface reconfiguration is not performed and current interface 102a is maintained. Alternatively, if the dynamic reconfiguration module 112 determines that one or more customization rules are satisfied, then the dynamic reconfiguration module 112 adjusts the interface 102a according to the applicable customization rules to generate the reconfigured interface 102b. The server 110 provides data for the reconfigured interface 102b to the device 102 over a network, such as the Internet, and the device 102 displays the reconfigured interface 102b.

After the dynamic reconfiguration module 112 performs the interface reconfiguration, the reconfigured interface 102b can display customized information selected and formatted based on the user input data 104 and the user behavior data 106. For example, as depicted in FIG. 1A, the reconfigured interface 102b can display health-related information associated with biometrics associated with the user, activity schedules that include reminders and/or other information related to user activities. In some instances, the content that is displayed on the reconfigured interface 102b can vary based on the specific user context indicated by the user behavior data (e.g., during a workday or during a weekend, or whether the device 102 detects that it is at the user's home, work, or gym using GPS or other location data). In other instances, the content and arrangement of information displayed on the reconfigured interface 102b can vary based on specific user preferences and/or prioritizations. For example, as depicted in each of the interfaces in FIGS. 3A-3C, the reconfigured interface 102b can include content that is tailored for a specific individual user.

The parameters of reconfigured interface 102b can be saved and used as the starting point for further reconfiguration. For example, the reconfigured interface 102b may be designated as the initial interface 102a for a subsequent interface reconfiguration cycle. For example, the reconfiguration process may be repeated at regular intervals (e.g., every 5 minutes, hourly, daily, etc.) or in response to receiving new user input data 104 or user behavior data 106. In some implementations, the reconfiguration may be ongoing or substantially continual, for example, with each new piece of information about the user being assessed to determine whether the interface should be adjusted. As additional examples, receiving certain types or categories of user data may trigger further reconfiguration analysis, while other types of user data may not. Additionally, the device 102 or the server 110 may assess user activity patterns indicated by the user behavior data 106 to predict recurring activities or needs of the user. For example, based on a location history of the device 102 (e.g., showing times when a user is at home, at work, or at the gym) or movement patterns of the device 102 (e.g., reflecting periods of sleep, exercise, etc.), typical events in user's day may be predicted. The reconfiguration process may be initiated at the predicted times of these events or within a range of time before or after the predicted times.

Figure 1B:
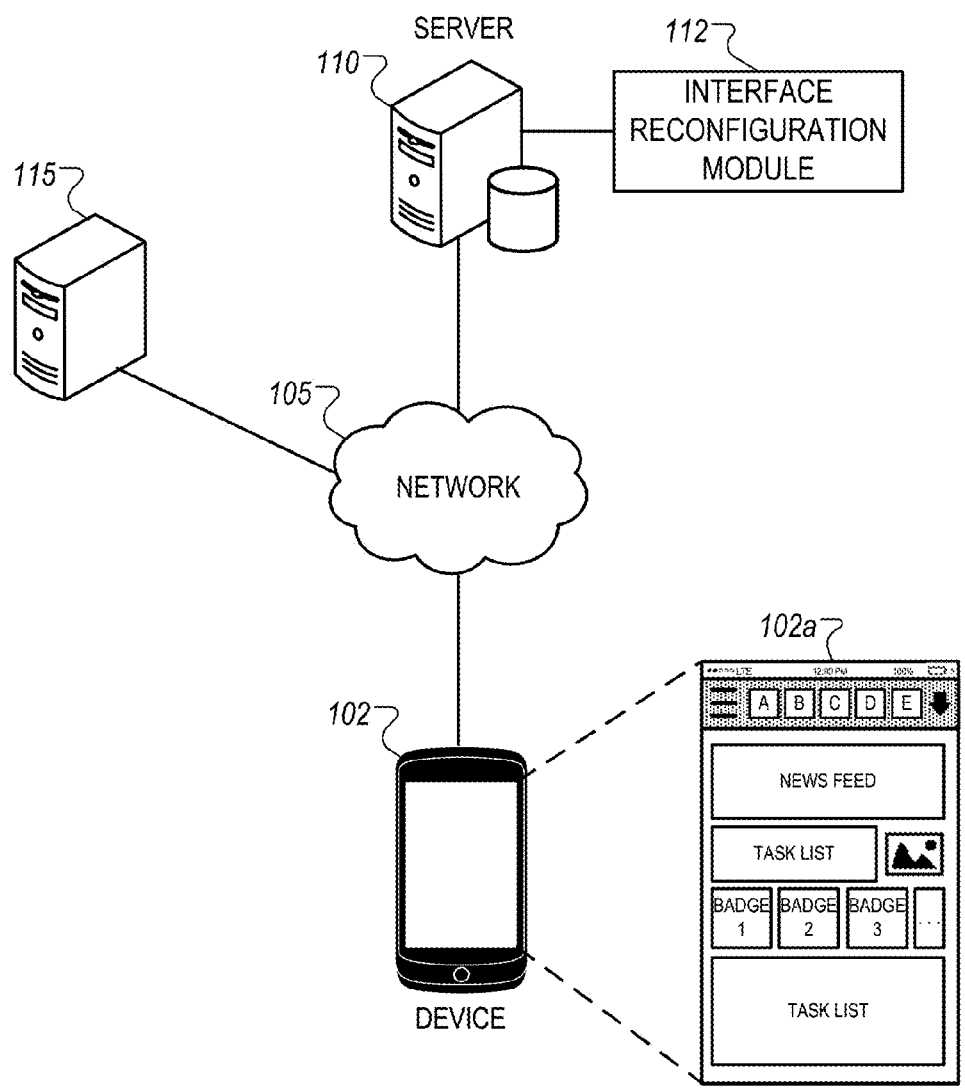
FIG. 1B is a block diagram that illustrates an example of a system for dynamically reconfiguring a user interface.

FIG. 1B is a block diagram that illustrates an example of a system 100 for dynamically reconfiguring a user interface. Briefly, the system 100 can include the server 110 and the device 102 communicating over a network 105. In addition, the server 110 can include the dynamic reconfiguration module 112 and the device 102 can display the interface 102a and the reconfigured interface 102b (not shown) as described previously with respect to FIG. 1A.

The server 110 can periodically exchange data with the device 102 over the network 105. For example, the server 110 can receive the user input data 104 and the user behavior data 106 from the device 102. The dynamic reconfiguration module 112 can be a software module of the server 110 that processes the received data transmissions from the device 102 and determines when to initiate an interface reconfiguration and what adjustments to make based on the received data transmissions. For example, as described more particularly with respect to FIGS. 2A-2F, the dynamic reconfiguration module 112 may determine whether one or more conditions necessary to initiate an interface configuration are satisfied. As described with respect to FIG. 1A, the dynamic reconfiguration module 112 may access the tables 114 stored by the server 110 and perform a set of rule comparisons to determine if the one or more conditions have been satisfied based on the transmissions from the device 102.

Figure 1C:
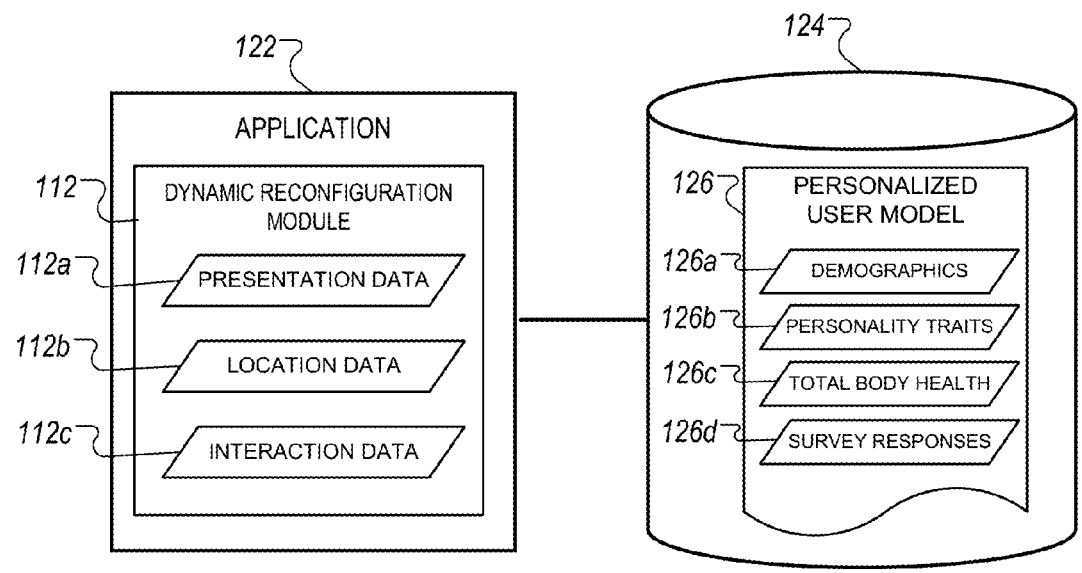
FIG. 1C is a block diagram that illustrates an example of an application that can be dynamically reconfigured.

In some implementations, the dynamic reconfiguration module 112 may be a software component executing on the device 102. For instance, the dynamic reconfiguration module 112 may be configured to operate based on a set of computer-implemented instructions stored locally at the device 102. For example, as depicted in FIG. 1C, the dynamic reconfiguration module 112 may be a module within a software application that is installed on the device 102. Other arrangements are also possible. For example, the functions of the dynamic reconfiguration module 112 may be split between the server 110 and the device 102. For example, the server 110 may periodically provide updates to rules and other application data stored at the device 102, and an application on the device 102 may apply the rules to carry out interface reconfiguration.

Figures 4A, 4B:
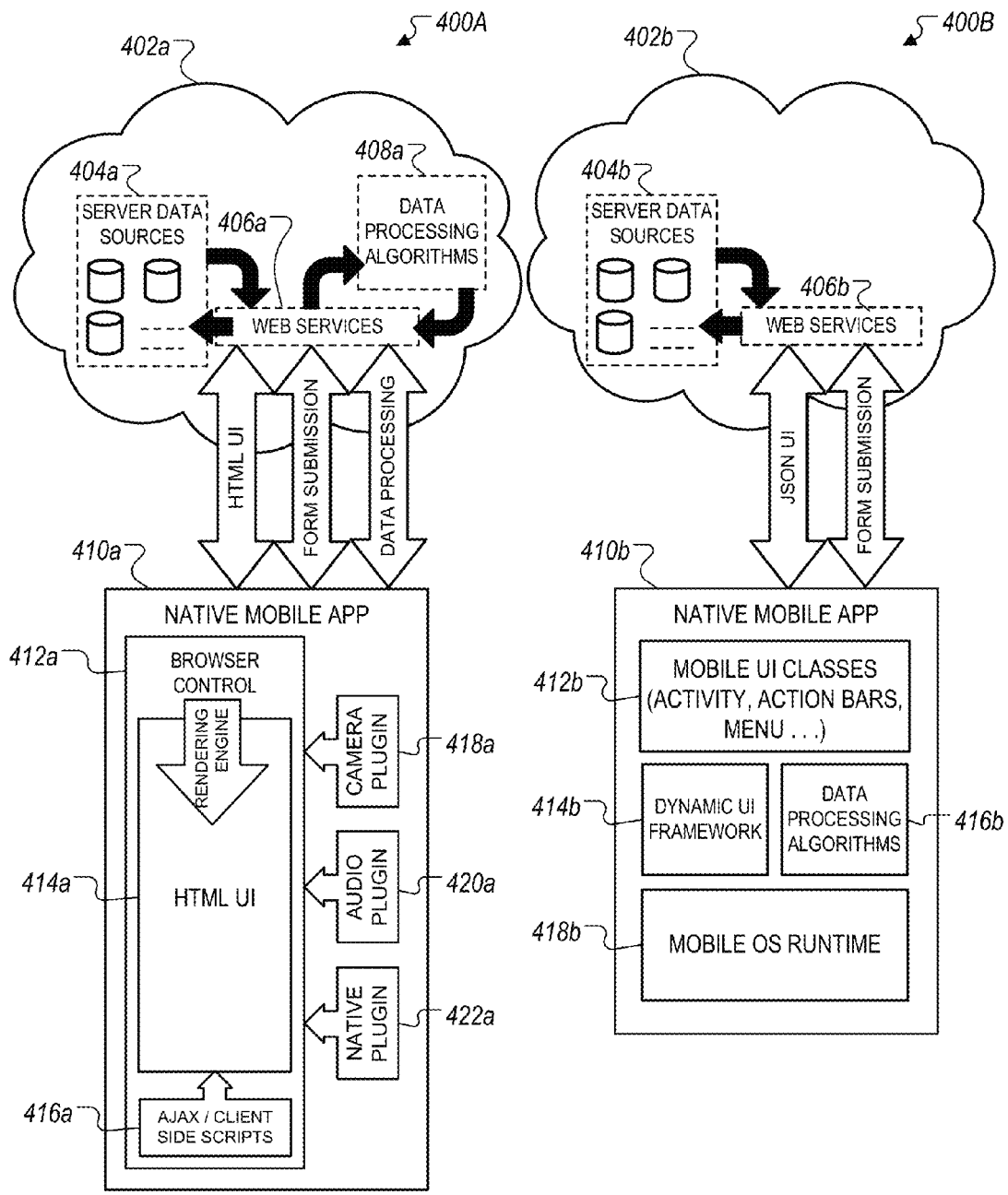
FIGS. 4A-4B are diagrams that illustrates examples of implementations that can be used to dynamically reconfigure a user interface.

The interface 102a and the reconfigured interface 102b may be provided for display on the device 102 using various types of application framework architectures. For example, FIGS. 4A and 4B depict two exemplary application framework architectures that may be used to provide the interface 102a and the reconfigured interface 102b on the device 102.

The device 102 can be any of various types of electronic devices that are capable of providing a user interface. Although FIGS. 1A-1B depict the device 102 as a smartphone, in some implementations, the device 102 may be a tablet computing device, a laptop computing device, a desktop computing device, or a wearable device (e.g., a watch, glasses, a bracelet, etc.). In addition, a user interface may include information provided through a visual display, but may additionally or alternatively provide information through, for example, audio output, haptic outputs, and electroshock which may be dynamically configured based on information about the user.

Each of the outputs of a user interface may be dynamically reconfigured. For example, depending on a user's responses to visual notifications, audible notifications, electroshock stimulations and haptic notifications (such as vibration of a mobile phone), the application on the device 102 may adjust the manner in which the application uses these outputs. For example, if notifications requiring user action are dismissed, the reconfiguration process may cause future notifications to be provided through a different combination of output modes (e.g., haptic output instead of or in addition to visual output). The appearance of visual notifications may be adjusted, as well as the sound, volume, or length of audio notifications and the intensity, pattern, or type of haptic outputs. Similarly, analysis of the user's responses to different output types may indicate that a particular user responds best to certain types of outputs at certain times of day. For example, from analysis of a user's responses, the dynamic reconfiguration module 112 may infer that a particular user responds most frequently to haptic outputs during certain daytime hours (e.g., when the user likely is carrying his phone or in a sound sensitive area, such as a theater or at work), but responds more frequently to audible notifications at certain hours in the evening (e.g., when the user may no longer be carrying the phone but is still awake, or asleep as part of a wake up alarm from a nap or for morning related events).

In some implementations, the system 100 includes one or more other servers 115 or other devices that provide information that is used to reconfigure the user interface 102a. For example, a healthcare application may communicate with independent, third-party systems operated by a user's healthcare provider, health insurance provider, or employer. The interface reconfiguration module 112 may initiate a new reconfiguration cycle for the interface 102a in response to receiving information from these third-party systems. Similarly, information from these third-party systems may be used to select which content should be presented and determine how prominently the content should be displayed (e.g., at what size or ranking in a list the content should be shown). For example, the interface reconfiguration module 112 may access electronic medical records (EMR) from a user's physician to determine or verify a user's care plan, and then configure the interface 102a to include information corresponding to that care plan. As a result, the interface 102a can be automatically updated to provide, for example, physician appointment reminders, medication reminders, encouragement for health plan compliance, instruction and information, and surveys related to the care plan. Similarly, when an employer's health plan options and incentives change, the server 110 can be notified and the interface reconfiguration module 112 can reconfigure the interface 102a to inform the user.

FIG. 1C is a block diagram that illustrates an example of an application 122 that can be dynamically reconfigured. For example, the application 122 may be a mobile device application that a user may download from an app store and install on a phone, tablet, or other device. The application 122 may include the dynamic reconfiguration module 112 and store user data within a storage medium 124. The dynamic reconfiguration module 112 may communicate with another dynamic reconfiguration module 112 on the server 110. In some implementations, processing to effect the reconfiguration may be performed entirely on the server 110.

The application 122 may be reconfigured based on data in a personalized user model 126. The user model 126 may be stored in a storage medium 124 accessible to the dynamic reconfiguration module 112. The storage medium 124 can be, for example, a storage device of the server 110, an internal storage device of the device 102, or remote storage such as cloud-enabled storage accessible over the network 105.

The personalized user model 126 that includes user information such as demographics 126a, personality traits 126b, total body health information 126c, and survey responses 126d. In some implementations, each user has a separate user model 126 representing that user's individual preferences and characteristics. Although not depicted in FIG. 1C, the personalized user model 126 can also include other types of information that are used by the application 122 to determine user preferences. The demographics 126a can include geographic information, ethnicity, spoken language, and/or user age.

The personality traits 126b can include various personality classifications based on user behaviors and user interaction with the application 122. The personality traits 126b may also include psychological attributes that describe degrees of openness, conscientiousness, extraversion, agreeableness, or neuroticism. In addition, the personality traits 126b may specify a score for each attribute that indicates where a particular user fits within a personality spectrum (e.g., from cautious/consistent to curious/inventive, careless to organized, introverted to extroverted, etc.). The personality traits 126b may be determined based on a user's responses to an initial personality questionnaire during enrollment. Similarly, personality traits in the user model may be added or adjusted in response to later survey responses, user inputs outside of surveys, and user behaviors performed independent of the application 122.

The total body health information 126c may include personal health metrics such as height, weight, blood pressure, resting heart rate, body-mass index (BMI), organ details of the pancreas, liver, heart, lungs, brain and clinically-relevant information such as existing chronic diseases, eyesight, hearing, touch responsiveness, or touch and smell, or historical medical information such as genome matching, family histories, or immunization records. In addition, the total body health information 126c may include user activity information such as daily exercise, daily metabolism, daily calories burned, and energy levels, degree of activity or number of steps taken. This information may also include, for example, indications of medical conditions a user is experiencing, information about current care plans, and health goals.

The survey responses 126d may include user-submitted responses to survey questions that are presented during user enrollment or feature updates. For instances, the user-submitted responses may be used to determine specific user preferences related to the display of the user interface (e.g., preferred colors, fonts, and sizes), or more generally, specific user requirements that may relate to usage of the application 122 (e.g., lifestyle choices, diets).

The personalized user model 126 can be generated once a user provides enrollment data during an initial configuration of the application 122. For example, a user can initially download the application 122 from a mobile app store associated with the operating system of the device 102. During the initial installation of the application 122 on the device, the user can provide user-specific information related to each of the demographics 126a, the personality traits 126b, the total body health information 126c, and the survey response 126d. In some instances, the user may additionally provide health program-specific information that relates to a particular use of the interface 102a. In one example, the program-specific information may include health-related information associated with a disease management program, an employee wellness program, or a personal diet program, other personal improvement programs. The user-specific information and the program-specific information can then be aggregated by the application 122 to generate the personalized user model 126.

After the personalized user model 126 is generated, either by the module 112 or another system, the dynamic reconfiguration module 112 may process the user-submitted data to adjust user interface characteristics independent of additional user input (e.g., without manual configurations or selections of interface parameters). As an example, the dynamic reconfiguration module 112 may access the patient information and determine that the patient is of an advanced age, and as a result display an interface with increased text size and contrast to compensate for the user's potentially weaker vision.

The user input data 104 that the application 122 may provide to the application 122 may include, for example, presentation data 112a, location data 112b and interaction data 112c. Although not depicted in FIG. 1C, the dynamic reconfiguration module 112 may receive other types of user input data 104 that are related to user interaction with the initialized user interface 102a.

The presentation data 112a may include interface style guide details based on prior user-selected inputs, configurations, and/or selections. For example, the presentation data 112a may include font settings, object sizes (e.g., display areas, frames, or windows), background graphics, border designs, user-selected highlights, field entries, keyboard configurations, pointer configurations, audible pattern selections (e.g., ringtones), annunciations, voice recognition queries, and/or vibration settings. In each of these examples, user-selected features, related to the display and usage of the interface 102a, may be used by the dynamic reconfiguration module 112 to predict a desired look and feel for the reconfigured interface 102b. In some implementations, the dynamic reconfiguration module 112 may merge the interface characteristics designated by explicit user selections with other interface characteristics that the dynamic reconfiguration module 112 predicts or infers will be helpful to the user. Similarly, the dynamic reconfiguration module 112 may shift from user-selected interface characteristics to different characteristics selected by the dynamic reconfiguration module 112 gradually, for example, over the course of several reconfiguration cycles.

The location data 112b may include data indicating the location and presence of interface resources that are included within the interface 102a. For example, the location data 112b may include resource selections and deselections, screen transitions, field entries, field completions, object visibility information (e.g., transparency), object type information (e.g., radio buttons, lists, etc.), or icons associated with particular actions (e.g., message acceptance or message dismissal).

The interaction data 112c can include data that describes a user's interactions with features of the interface 102a. For example, the interaction data 112c may include data that tracks touch screen gestures or mouse cursor movement over the interface 102a. The interaction data 112c can also include user responses to displayed notifications/alerts, or on-screen messages. Similarly, the interaction data can indicate which messages or content a user interacted with, how soon after it was presented, and the amount of time interaction occurred. In addition, the interaction data 112c can also include customized interface features that are commonly used by the user such as, for example, personalized messages or customization rules based on information that is accessible on the interface 102a.

The dynamic reconfiguration module 112 may periodically update the personalized user model 126 after an initial user registration for the application 122. In addition to updating the personalized user model 126 based on the user input data 104 as described above, the personalized user model 126 may also be updated based on the user behavior data 106, which can be used to determine an updated user context or changes to user activity patterns that may impact user preferences for the interface 102a. For instance, the dynamic reconfiguration module 112 may determine such changes by passively monitoring the user behavior data 106 on the device 102. In one example, location information of the user may be monitored using geo-tracking data based on a global positioning system (GPS) signal, mobile broadband cell tower proximity, proximity to landmarks, Wi-Fi proximity, Bluetooth proximity, or internet protocol (IP) address associated with the device 102. In another example, user activity data on other applications such as social media, games, and/or education may be collected and analyzed to determine changes in user activity. In each of these examples, the monitored user data may be used to make inferences about present user conditions, relative to prior user conditions, and generate predictive models of future user activity, which are then reflected within the adjusted personalized user model 126.

The dynamic reconfiguration module 112 may also provide customized interface elements for display on the reconfigured interface 102b after reconfiguring the interface 102a. For instance, the dynamic reconfiguration module 112 may provide personalized notifications, requests, media, and surveys that are generated or selected based on the user behavior data 106. For examples, the dynamic reconfiguration module 112 may display notifications indicating user activity that differs from historical patterns (e.g., lower physical activity compared to historical activity), adjust the presentation of information based on user-specified priorities (e.g., biometric information displayed above lifestyle choices), and/or periodically send customer surveys to reaffirm predictions of user activities (e.g., sending a personalized survey requesting user submissions related to monitored user activity). In each of these examples, the dynamic reconfiguration module 112 may dynamically generate personalized user content and formatting for display on the reconfigured interface 102b without explicit or active user interface adjustments. In this regard, the personalized user content is adjusted over time to be attuned to a particular user and periodically modified reflect time-dependent adjustments in user behaviors and/or preferences.

Figure 1D:
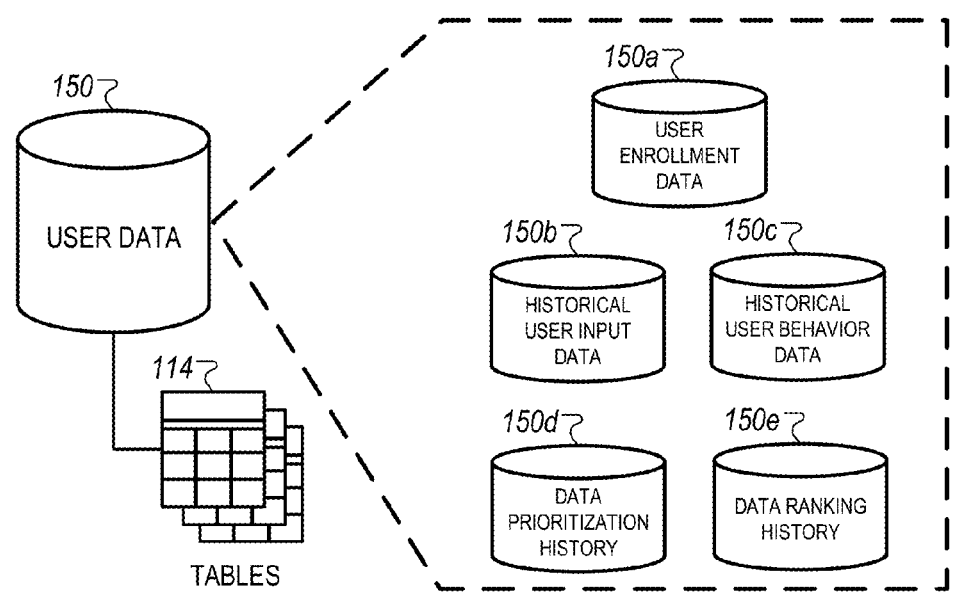
FIG. 1D is a block diagram that illustrates examples of user data.

FIG. 1D is a block diagram that illustrates examples of user data 150. For instance, as described with respect to FIGS. 1A-1B, the user data 150 can represent data associated with a user that is stored by the server 110. The user data 150 can include various types of user information such as, for example, user enrollment data 150a, historical user input data 150b, historical user behavior data 150c, data prioritization history 150d, and data ranking history 150e.

The user enrollment data can include user-specific information and program-specific information that is submitted by the user during an initial enrollment. For instance, as described with respect to FIG. 1C, after installing the application 122 on the device 102, the user may provide information that is initially used to generate the personalized user model. For example, the user enrollment data 150a may include demographics 126a, personality traits 126b, total body health information 126c, and/or survey responses 126d. In addition, the user enrollment data 150a may be periodically updated as the user is provided subsequent surveys that ask the user to confirm responses that were provided during the initial enrollment.

The historical user input data 150b can include previously submitted user input data 104. For example, as described with respect to FIG. 1C, the historical user input data 150b can include user-submitted search queries, voice queries, text entries, user inputs, and/or other types of inputs that are received through the interface 102a.

The historical user behavior data 150c can include user context data that is determined independently of the user input data. For instance, as described with respect to FIG. 1C, the historical user behavior data 150c may include user activity on other applications on the device 102, location information associated with the user, and/or other types of behavioral information indicating a particular user context.

The data prioritization history 150d can represent a repository of previously designated data priority scores associated with previously submitted user information. For instance, as described with respect to FIG. 1C, the data prioritization history 150d can include previously determined priority scores during a prior interface reconfiguration operation based on user-submitted information, and/or inferences based on user behavior data.

Figure 2A:
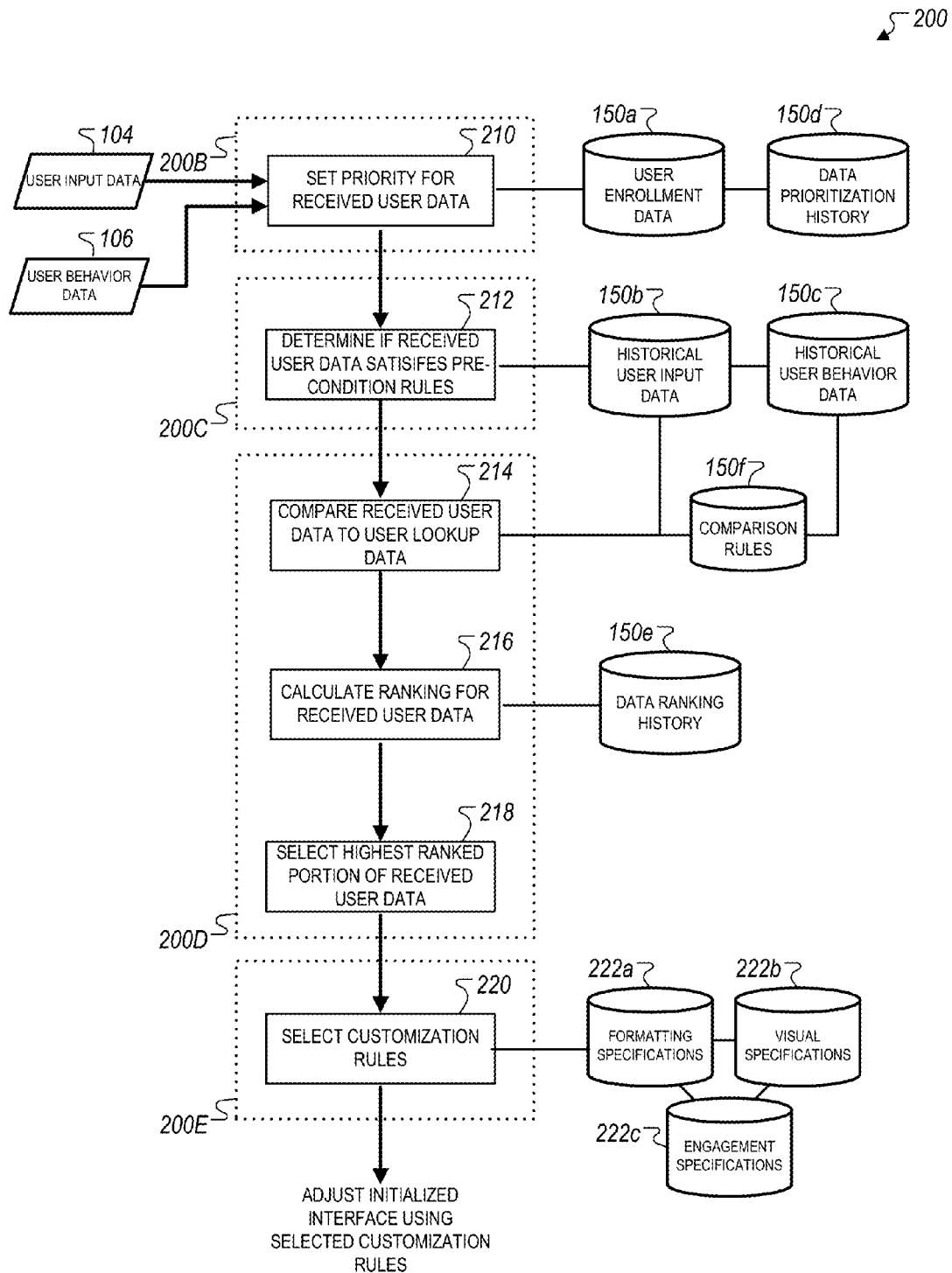
FIGS. 2A-2E are diagrams that illustrate examples of data processing techniques for dynamic reconfiguration of a user interface.
Figure 2B:
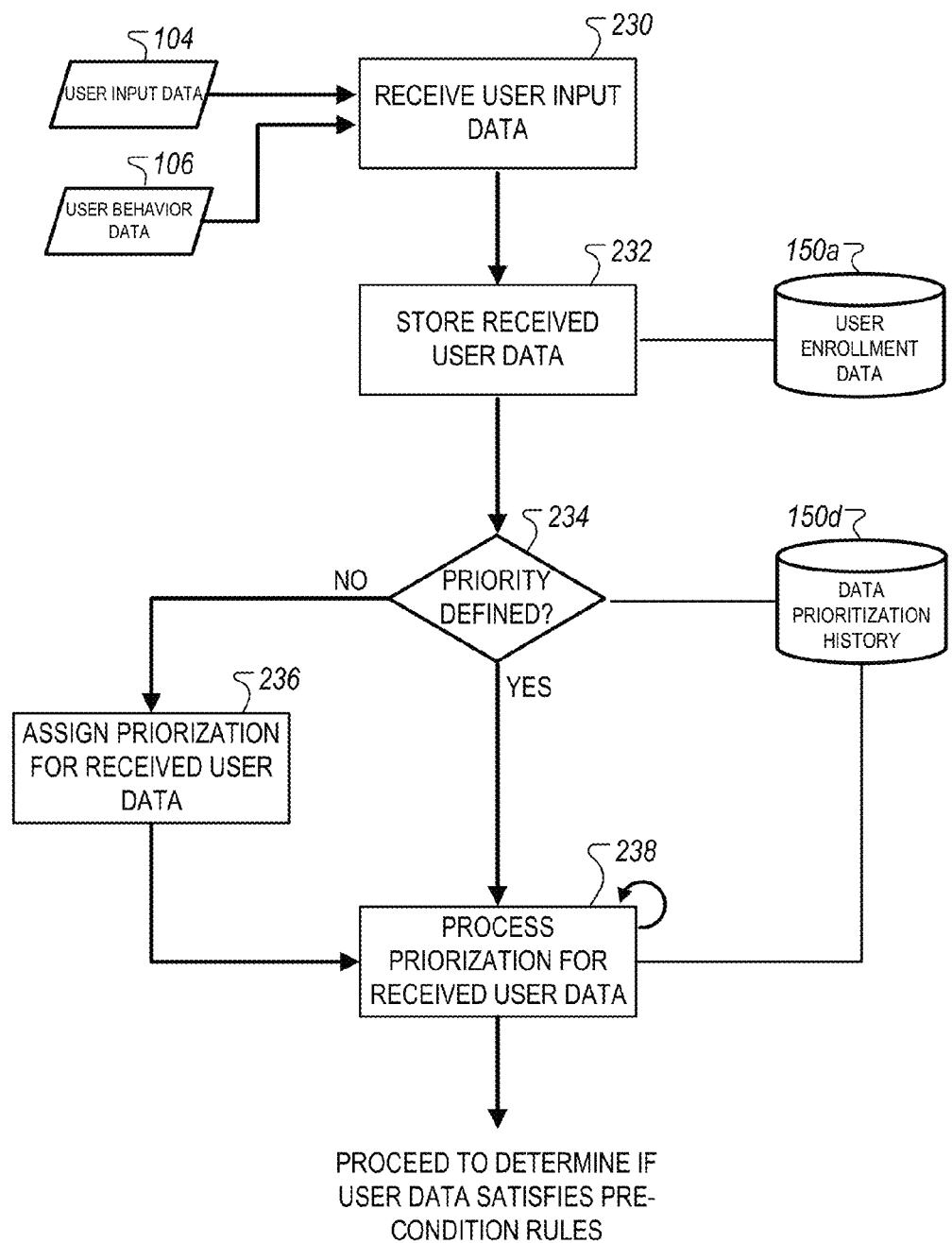

In some instances, as described more particularly with respect to FIG. 2B, the data prioritization history 150d may be used to determine if subsequent user input data indicates whether user preferences has changed. For example, if a user submits a similar user input at different time points, then the priority score associated with the input at the earlier time point may be compared against a computed priority score associated with the input at the later time point to determine if a particular user preference for the interface 102a that is related to the submitted user input has changed. In this example, if the comparison between the priority scores indicates a significant change in user preference (e.g., a difference in scores that exceeds a threshold amount), then the dynamic reconfiguration module 112 may initiate an interface reconfiguration operation to adjust the interface 102a such that the reconfigured interface 102b is more closely tailored to the priority score associated with the newer input.

In some implementations, the data prioritization history 150d may additionally be used to predict long-term changes in user behavior, which may then be used to dynamically reconfigure the interface 102a over longer term periods to naturally adapt to changes in user preferences. For example, if a user has been diagnosed with a chronic disease that slowly impairs visual function, then the data prioritization history 150d can be used to predict that visual features associated with the interface 102a will become more important as the user's visual functions degenerate over periods of time. In this example, the dynamic reconfiguration module 112 may subsequently weight prioritization scores associated with visual features with larger magnitudes, such that during subsequent interface reconfigurations, visual features are more likely to be tailored to a user's specific needs from the interface. As a result, the dynamic reconfiguration module 112 may prioritize large visual elements and easily readable colors over other adjustments that would provide more information or cause significant changes to the layout.

The data ranking history 150e can include previously determine rankings associated with different types of content that are displayed on the interface 102a. For instance, the data ranking history can include a log of ranking scores that were previously determined during prior interface reconfiguration operations based on previously submitted user input data 104 and user behavior data 106. Techniques for ranking content that is displayed on the reconfigured interface 102b are described more particularly with respect to FIG. 2E.

In some implementations, the data ranking history 150e can be used to predict user preferences towards specific types of content given an identified current user context. A user context may represent the physical state of the device 102 (e.g., location, orientation, acceleration levels, and other data sensed by the device 102) and/or activities of the user that can be inferred from information received by the device 102. The user contexts may represent predefined categories or activities (e.g., a user is likely sleeping, driving, walking, jogging, etc.), or may be unique combinations of inputs that are not predefined. For instance, previous content ranking scores may be aggregated and associated with predicted user contexts to determine specific types of content that is most valuable to a user during each predicted user context. In this regard, during a current interface reconfiguration operation, the data ranking history 150e may be used by the dynamic reconfiguration module 112 to determine the most effective content arrangement or layout for the reconfigured interface 102b given a particular user context associated with the user behavior data 106. For example, when movement data from the device 102 indicates that the user is driving or jogging, information may be presented audibly instead of visually so that the user does not need to look down at the device 102.

FIG. 1E is a diagram that illustrates examples of adjustment specifications for an interface reconfiguration. For instance, customization rules 162 specify a set of adjustment specifications for a set of conditions associated with user input, user behavior, and user attributes. Context rules 164 specify a set of adjustment specifications for a set of user contexts associated with the user. A user context represents a current task, activity, location, an environment of the user, or a combination of such information (e.g., activity data associated with mobile applications on a mobile device, location information extracted from GPS data, or recent queries submitted within a period of time).

The context rules 164 refers to rules that are designated to be applicable only to one or more specific user contexts. For example, a user context representing the activity of sleeping may be determined based on, for instance, light sensed by a device, a time of day, and a movement pattern or lack of movement of the user. The context rule 164 may apply to a user context of sleeping, and may indicate that audible outputs and notifications of the application are delayed or omitted while this user context is detected. As another example, a user context of exercising may be determined based on motion of the device or other factors such as sensor data. The context rule 164 for the exercising context may increase volume of audible outputs, and may increase positive feedback or motivational content.

The customization rules 162 can specify adjustment specifications related to the size of objects to be displayed on the reconfigured interface 102b, placement of objects to be displayed within particular regions of the reconfigured interface, and a content arrangement or layout for other objects that may also be displayed on the reconfigured interface 102b. In the examples depicted in FIG. 1E, different combinations of user input, user behavior, and user attributes are associated with individual adjustment specifications. In this regard, the customization rules 162 provide multi-factor adjustment specifications that are not only customized for a particular user (e.g., user attributes), but dependent on user input (e.g., selection of objects), and user behavior (e.g., activities relevant to content of objects).

The context rules 164 can specify adjustment specifications related to how notifications are presented to a user based on a detected user context. Although the presentation of notifications are depicted, in other instances, other types of adjustment specifications can also be provided based on the detected user context. In the examples depicted in FIG. 1E, a user context may be determined based on the detected location of the device 102. The location data may then be used to predict whether the user is at work, home, or presently traveling. After detecting the user context, the adjustment specifications may be used to direct the presentation of notifications on the reconfigured interface 102b based on the detected user context.

Figure 2C:
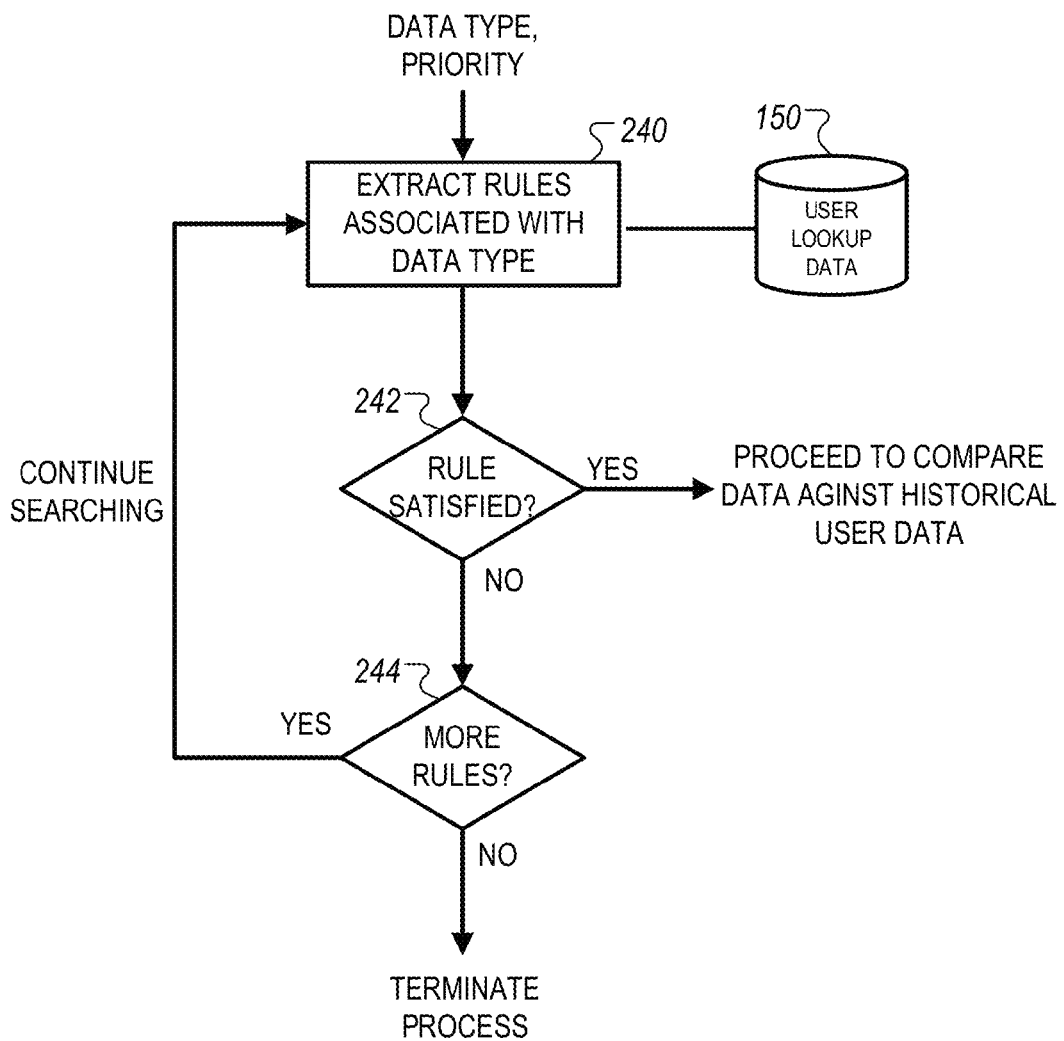
Figure 2D:
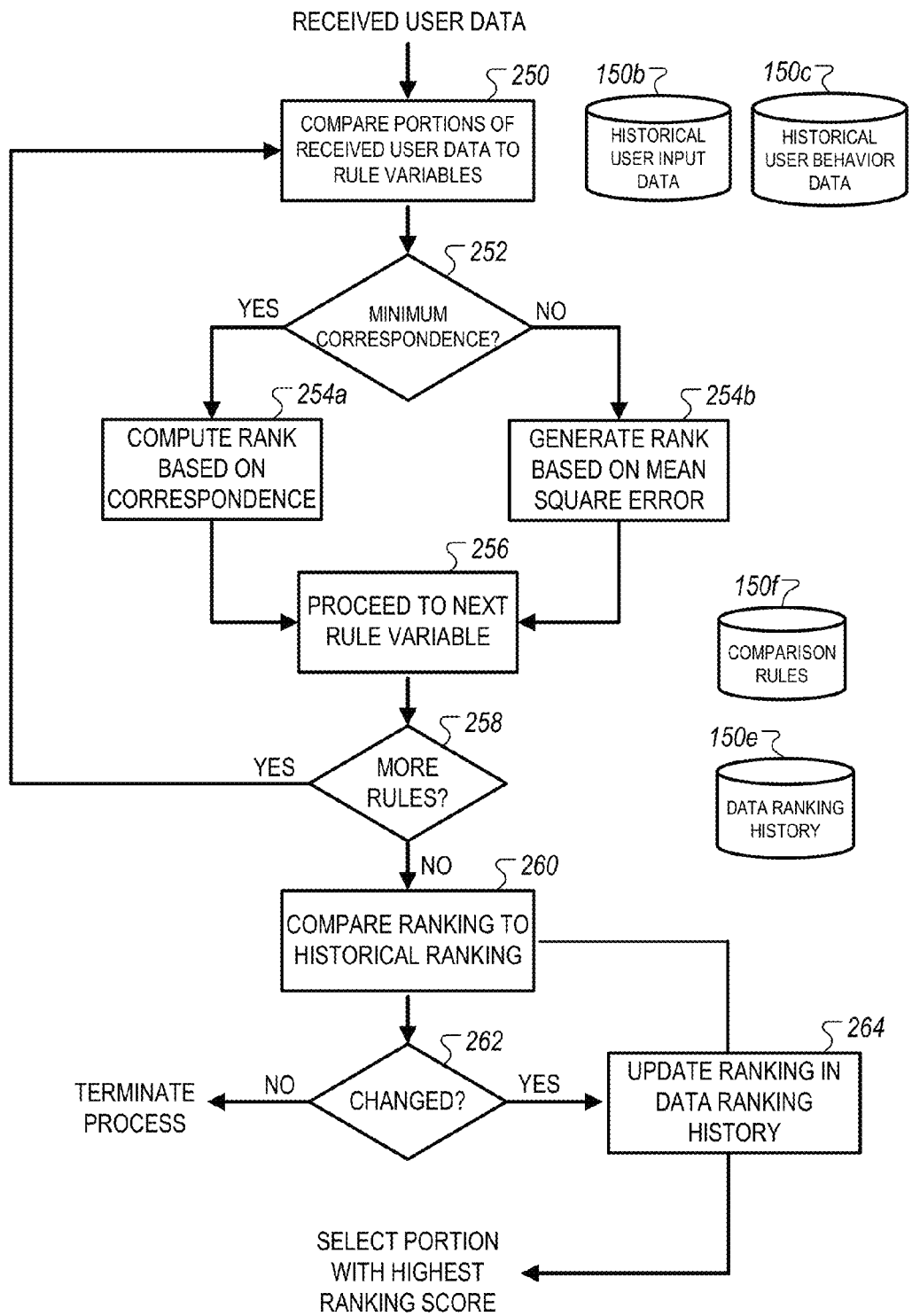
Figure 2E:
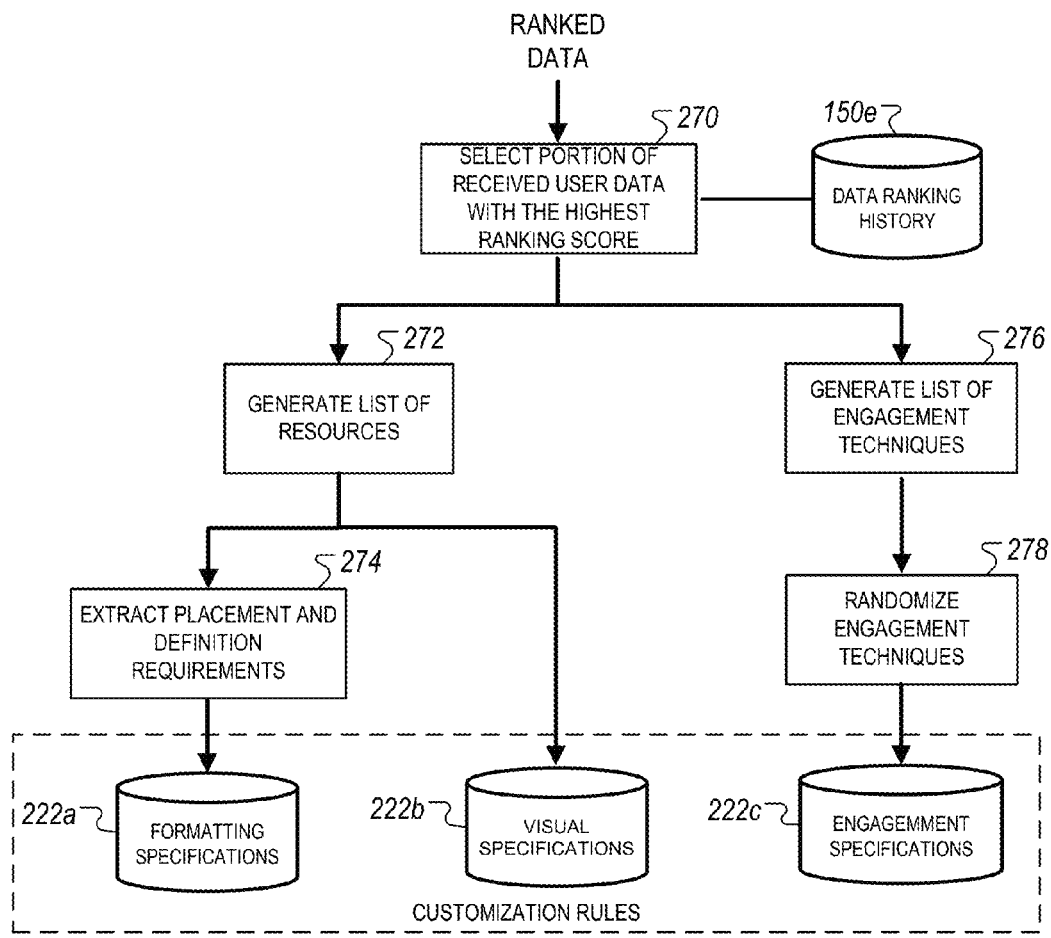

FIGS. 2A-2E are diagrams that illustrate examples of data processing techniques that are used during dynamic reconfiguration of a user interface. FIG. 2A depicts a process 200 for selecting a set of customization rules that are used to reconfigure the interface 102a. The process 200 can be subdivided into a set of sub-processes that are described in more detail with respect to FIGS. 2B-2E. For instance, FIG. 2B depicts a sub-process 200B for prioritizing received user data based on historical user data, FIG. 2C depicts a sub-process 200C for determining whether one or more trigger rules are satisfied to initiate an interface reconfiguration operation, FIG. 2D depicts a sub-process 200D for ranking user data based on a set of customization rules, and FIG. 2E depicts a sub-process 200E for formatting content displayed on a reconfigured interface.

Referring to FIG. 2A, the process 200 may be used to select customization rules that are used to adjust the interface 102a and generate the reconfigured interface 102b. The customization rules can include three general categories of adjustments: (1) formatting specifications 222a that configure how displayed content is organized and arranged on the reconfigured interface 102b (e.g., layouts of objects, sizes of objects, coordinate positions or relative positions of objects on the interface, etc.), (2) visual specifications 222b that configure the display properties of elements of the reconfigured interface 102b (e.g., sets of icons to be displayed, text fonts used, color palates, design themes, etc.), and engagement specifications 222c that configure how information is presented to the user (e.g., transitions between different display screens, notification/alerts displayed on the interface, level of interactivity of elements, etc.).

The process 200 is performed after a user has installed the application 122 on the device 102, participated in a user enrollment, an initial configuration of the personalized user model 126, and generation of the interface 102a. As described with respect to FIG. 1D, all user information prior to initiating the process 200 may be stored in the user data 150. For example, the user lookup data can include user enrollment data 150a, historical user input data 150b, historical user behavior data 150c, data prioritization history 150d, and data ranking history 150e.

Initially, the dynamic reconfiguration model may receive new user input data 104 or new user behavior data 106. For instance, the dynamic reconfiguration module 112 can receive a new user text query or new context data during a recent user session on the device 102. In response, the dynamic reconfiguration module 112 can then determine a priority for the received user input data 104 and user behavior data 106 based on the historical information included in the user enrollment data 150a and the data prioritization history 150d (210). The prioritization sub-process 200B is depicted in FIG. 2B.

After setting a priority to the received user data, the dynamic reconfiguration module 112 then determines if the received user data exists within the user information included in the historical user input data 150b and the historical user behavior data 150c (212). In this step, the dynamic reconfiguration module 112 initially determines if the received user data satisfies one or more conditions to initiate an interface reconfiguration operation. The trigger rule satisfaction sub-process 200C is depicted in FIG. 2C.

If the dynamic reconfiguration module 112 determines that at least one condition to initiate the interface reconfiguration has been satisfied, the dynamic reconfiguration then compares the received user data to the user information included in the historical user input data 150b and the historical user behavior data 150c (214), calculates rankings for each portion of the received user input data (216), and selects the highest ranked portion of the received user data (218). In these steps, the dynamic reconfiguration module 112 estimates ranking scores based on similar data attributes to historical user information, and then select the portion of the received user data that is identified to have the highest ranking score. The ranking sub-process 200D is depicted in FIG. 2D.

After selecting the portion of the received user data with the highest ranking, the dynamic reconfiguration module 112 then selects a set of customization rules that are used to adjust the interface 102a during an interface reconfiguration operation. In this step, customization rules that can include formatting specifications 222a, visual specifications 222b, and engagement specifications 222c are selected based on the attributes of the highest ranked portion of the received user data. The customization rule selection sub-process 200E is depicted in FIG. 2E.

Referring now to FIG. 2B, the prioritization sub-process 200B can be used to set a prioritization to newly received user data (e.g., user input data 104, user behavior data 106) using the data prioritization history 150d. For instance, the sub-process 200B may include receiving user input data (230), storing the received user data (232), determining if a priority is defined for the received user data based on the data prioritization history 150d (234), assigning a prioritization for user data if a priority has not been defined (236), and processing the prioritization for received user data (238).

In general, prioritization represents the relative important of different categories of user information based on user information included within the personalized user model 126. For instance, prioritization can be used to weight different categories of user data such that particular types of user data that are strongly associated with general user requirements of an interface are emphasized relative to other types of user data that do not coincide with general user requirements. As described with respect to FIG. 1C, user requirements may be determined during a user enrollment process where a user provides user-submitted information that includes user-specific information and program-specific information.

For example, a middle-aged male user that is diagnosed with visual impairment may provide user requirements that indicate a high prioritization for visual indicators (e.g., larger fonts, high color contrast, etc.). In comparison, an adolescent girl that uses an interface for playing games and completing simple tasks may provide user requirements that indicate a high prioritization for graphical illustrations (e.g., pictures, logos, etc.). In another example, a middle-aged overweight woman that is a primary provider may provide user requirements that indicate a high prioritization for interface functionality and visualization (e.g., multi-taking content arrangement, data analytics visualizations, etc.).

In each of the examples described above, user information included within the user enrollment data 150a can initially be used to make inferences related to data prioritizations, which can then be adjusted over time as users provide additional input data (e.g., user input data 104) and additional behavioral data (e.g., user behavior data 150c) is collected by the dynamic reconfiguration module 112. In this regard, the prioritization sub-process 200B may be used to aggregate prior prioritization information included within the data prioritization history 150*d* to make inferences on subsequently received user data.

As step 232 indicates, after each instance of the prioritization sub-process is executed, the received user data is stored within the user enrollment data 150*a* such that the aggregate user information within the user enrollment data 150*a* is updated to reflect changing user prioritizations over time.

During the decision point 234, attributes of the received user data are extracted to determine if the particular category of the received user data has been previously defined within the data prioritization history 150*d*. For example, if the received user data includes a commonly submitted user input, then the dynamic reconfiguration module 112 may determine that the prioritization for the received user data has already been defined, and in response, may proceed to process the prioritization for a prior user input that is substantially analogous to the received user input.

Alternatively, if the received user input has determined to not have a defined priority, then the dynamic reconfiguration module may assign a prioritization for the received user data. For instance, the dynamic reconfiguration module 112 may predict a prioritization score by initially categorizing the received user data, and then calculating the prioritization score based on the prioritization score for the most similar user data category within data prioritization history. In this instance, after assigning the new prioritization score, the dynamic reconfiguration module 112 may then update the data prioritization history 150*d* so that it includes the newly calculated prioritization score.

Referring now to FIG. 2C, once a prioritization score for the received user data has been assigned, the condition satisfaction sub-process 200C may be used to determine if one or more reconfiguration trigger rules are satisfied to initiate a reconfiguration operation. For instance, the dynamic reconfiguration module 112 may initially receive a data type associated with the received user data and the prioritization score that was assigned by the sub-process 200B. The dynamic reconfiguration module 112 may then extract applicable trigger rules associated with the data type of the received user data (240), determine if at least one of the trigger rules has been satisfied (242) and proceed to the ranking sub-process if the at least one of the trigger rules has been satisfied.

Alternatively, if a particular trigger rule has not been satisfied, the dynamic reconfiguration module 112 may determine if there are other trigger rules associated with the data type (244), and proceed to evaluate the other trigger rules associated with the data type. In addition, if the dynamic reconfiguration module 112 determines that are no trigger rules that can be satisfied, then the dynamic reconfiguration module 112 may terminate the process such that an interface reconfiguration operation is not performed in response to the received user data.

The trigger rules may represent conditional requirements that determine whether a particular user input indicates whether user preferences, user requirements, and/or user context have sufficiently changed to require an interface reconfiguration. For instance, if the received user data indicates that the user remains in the same context as the initialized user interface 102*a*, then the trigger rule for the received user input will not be satisfied since the user is still determined to be in a context that is relevant to the initialized user interface. In another example, if a user provides a user input indicating that the user context has dramatically changed (e.g., traveling internationally), the trigger rule for the received user input will be satisfied because this indicates that the interface 102*a* should be adjusted to reflect the updated user context within the reconfigured interface 102*b*.

In some implementations, the satisfaction of the trigger rules may be determined based on performing a multi-factor analysis based on a number of factors associated with the received user data. In such implementations, weighting scores may be associated with each factors, and a composite score for each trigger rule may be calculated based on aggregating individual scores for different aspects of the received user data (e.g., location information, user context, user behavior, weather conditions, etc.). The composite score may then be compared to a threshold value to determine if the trigger rule has been satisfied. In this regard, the sensitivity of the sub-process 200C may be adapted to different user circumstances and/or adjusted based on a desired frequency of interface reconfigurations based on different user contexts indicated by the received user data. For example, the threshold value may be determined individually for different users, and an individual user's threshold may change as the context of the user changes.

Referring now to FIG. 2D, if at least one trigger rule for the data type associated with the received user data is satisfied, the dynamic reconfiguration module 112 may use the ranking sub-process 200D to compute ranking scores for portions of the received user data, and then select the portion of the received user data with the highest ranking score.

In general, the sub-process 200D includes two categories of comparisons: (1) a comparison between data values of portions of the received user data and historical data variables specified by a set of comparison rules 150*f* to compute a ranking score for each portion of received user data, and (2) after computing the ranking scores for each portion of the received user data, comparing the computed ranking scores to historical ranking scores for analogous user data included within the data ranking history 150*e*.

With respect to (1), the comparison rules 150*f* specify rule variables based on data values included within the historical user input data 150*b* and the historical user behavior data 150*c* such that the comparison between the data values of portions of the received user data and the historical data variables specified by the set of comparison rules 150*f* indicates a correspondence between portions of the received user data and historical user data.

With respect to (2), the computed rankings for the portions of the received user data may be compared against historical rankings for analogous user data included in the data ranking history 150*e* to determine if user preferences or requirements for the interface have changed since the previous interface reconfiguration operation. In this regard, in addition to selecting the portion of the received user data with the highest ranking score, the sub-process 200D may be used to track user activity to determine how to best adjust the interface 102*a*.

The sub-process 200D initially begins when the dynamic reconfiguration module 112 compares portions of the received user data to historical data variables specified by the comparison rules 150*f*. For instance, the comparison rules 150*f* can include multiple historical data variables. The values of the historical data variables can be determined based on historical user data included within the historical user input data 150*b* and the historical user behavior data 150*c*. In this regard, the comparison rules 150*f* specify specific conditions that are attributable to prior user activity. For example, an example of a comparison rule can be "(raining for 2 days) and (user has not moved for 2 days) and (user reported sad mood)." In this example, three historical data variables are specified, and are based on previous weather patterns, user activity data, and inferences from prior user inputs (e.g., inferring sad mood from types of emojis used in prior text messages in reference to prior text queries).

The received user data may be segmented into portions using various techniques. For instance, received user data may be segmented chronologically such that user inputs provided within a certain time range (e.g., five minutes) are included within a portion of the received user input. In other instances, received user data may be segmented based on the type of user data (e.g., text query data, voice query data, context data, etc.).

Once the received user data is segmented into a set of finite portions, each portions can then be categorized so that they are compared against particular comparison rules that also include similar types of user data. For instance, a particular portion of the received user data that includes current weather information may be compared against an applicable comparison rule that includes historical data variables that specify weather conditions based on prior user input or activity.

The comparison process between the portions of the received user data and the comparison rules 150f can proceed recursively for each portion of the received user data (250, 252, 254a, 258). For instance, the dynamic reconfiguration module 112 may initially identify all applicable comparison rules 150f for each portion of the received user data using a coarse comparison technique, and then recursively compare each portion against all of the applicable comparison rules 150f until no comparison rules 150f remain to be compared against. In some instances, if the dynamic reconfiguration module 112 is unable to determine an applicable comparison rule for a portion of the received user data, instead of comparing values within the portion of the received user data against historical data values specified within the comparison rules, the dynamic reconfiguration module 112 may generate the rank based on the mean square error (254b).

In addition, for larger portions of the receiver data that include multiple values, each value may be compared against each of the historical values included within an applicable comparison rule (256). For example, for a particular portion of received user data that includes five text strings and an applicable comparison rule that includes ten text strings, values of each of the five strings with the particular portion of received user data may be compared against the values of each of the ten strings within the applicable comparison rule.

Once each of the individual values within each portion of the user data has been compared to the historical data variables included within each of the applicable comparison rules, the dynamic reconfiguration module 112 may compute a ranking score for each portion of the received user data. For instance, the ranking score for a particular portion of the received user data can represent an overall correspondence between the particular portion and all of the applicable comparison rules. Since the historical values specified within the comparison rules 150f are based on historical information included within the historical user input data 150b and the historical user behavior data 150c, this ranking score is also an indication of the correspondence between the portion of the received user data and the historical user information.

After computing the ranking score for each portion of the received user data, the dynamic reconfiguration module 112 the compares the computed ranking score against a ranking score for analogous data included within the data ranking history 150e (260). If the computed ranking score for the portions of the received user data have not changed significantly compared to the ranking scores for analogous data determined within the data ranking history 150e, then the dynamic reconfiguration module 112 may determine that has not been a change in user preference to the interface 102a to perform an interface reconfiguration operation. In such an instance, the dynamic reconfiguration module 112 may terminate the sub-process 200D.

Alternatively, if the ranking score for at least of the portions of the received user data has changed relative to the ranking score for analogous data within the data ranking history, then the dynamic reconfiguration module 112 determines that a user preferences and/or requirements for the interface 102a may have changed since the last interface configuration operation. In such instances, the dynamic reconfiguration module 112 may update the ranking within the data ranking history 150e. After updating the data ranking history 150e, the dynamic reconfiguration module 112 may then select the particular portion with the highest ranking score and proceed to the sub-process 200E.

Referring now to FIG. 2E, after computing a ranking score for each portion of the received user data, the dynamic reconfiguration module 112 may use the customization rule selection sub-process 200E to generate specifications that are used to adjust the interface 102a during an interface reconfiguration operation. As described previously with respect to FIG. 2A, the customization rules may include three general types of adjustments: formatting specifications 222a, visual specifications 222b, and engagement specifications 222c.

The sub-process 200E initially begins after the dynamic reconfiguration module 112 selects the portion of the received user data with the highest ranking score (270). The selected portion is then used to generate a list of resources that should be displayed on the reconfigured interface 102b (272). The list of resources can include visual objects, text strings, and/or other displayable interface features that are determined to be relevant to the received user data. For example, if the received user data includes specific information related to the weather, then user information extracted from the user lookup data may be combined with this user data to include a list of resources that includes graphics related to anticipated weather conditions for the following day, the predicted daily temperature, or other displayable information that is determined to be relevant to the weather near the location of the user.

The list of resources may then be stored as the visual specifications 222b to be used within a subsequent interface configuration operation. For instance, the visual specifications 222b can include a list of objects that are relevant to the received user data such that during the next interface reconfiguration operation, one or more of the objects included within list may be displayed on the reconfigured interface 102b.

The dynamic reconfiguration module 112 may also extract placement and definition requirements for the list of resources based on the received user data (274). For instance, the dynamic reconfiguration module 112 may determine a content layout that directs the attention of the user to prioritized objects within the list of resource while minimizing attention to low priority objects. For example, in the list of weather-related resources, the dynamic reconfiguration module 112 may extract a placement requirement such that an object that depicts the probability of rain is displayed at the top at the reconfigured interface 102b, while the wind chill factor is displayed on the bottom. In this example, individual objects or resources within the list may be prioritized based on user requirements and/or preferences determined from the received user data, user enrollment data, or user behavior data. This prioritization can also be used to provide objects that reflect determinations as to whether a user should go outside (e.g., recommendations for indoor or outdoor activities), or provide messages to motivate the user to change activities based on the determinations.

The extracted placement and definition requirements for the list of resources may then be stored as a set of formatting specifications 222a for a subsequent interface reconfiguration operation. For instance, the formatting specifications 222a may specify the display arrangement on the reconfigured interface 102b, sizes of individual resources based on importance associated with information associated with each individual resources, specific fonts to use to emphasize information, etc.

In addition, the dynamic reconfiguration module 112 may generate a list of engagement techniques that specify how notifications, alerts and/or other messages should be provided to the user (276). For instance, the list of engagement techniques can be determined based on the type of information included within the received user data (e.g., text data, graphical data, etc.), the urgency for information to be displayed. In other instances, the list of engagement techniques may be based on user preferences and/or requirements for the interface indicated by the received user data. For example, the list of engagement techniques may include instructions to provide a text alert if the received user data indicates that user has trouble hearing. In another example, the list of engagement techniques may include instructions to provide different types of notifications for information of different priorities (e.g., producing an audible sound to indicate a high priority alert and producing a text box to indicate a low priority alert). In some instances where the list of engagement techniques includes multiple engagement techniques, the dynamic reconfiguration module 112 may randomize the particular engagement technique that is utilized to present information to the user (278).

The list of engagement techniques may be stored as the engagement specification 222c. For instance, engagement specifications 222c may associate particular engagement techniques with particular content that is to be displayed on the reconfigured interface 102b.

Figure 3A:
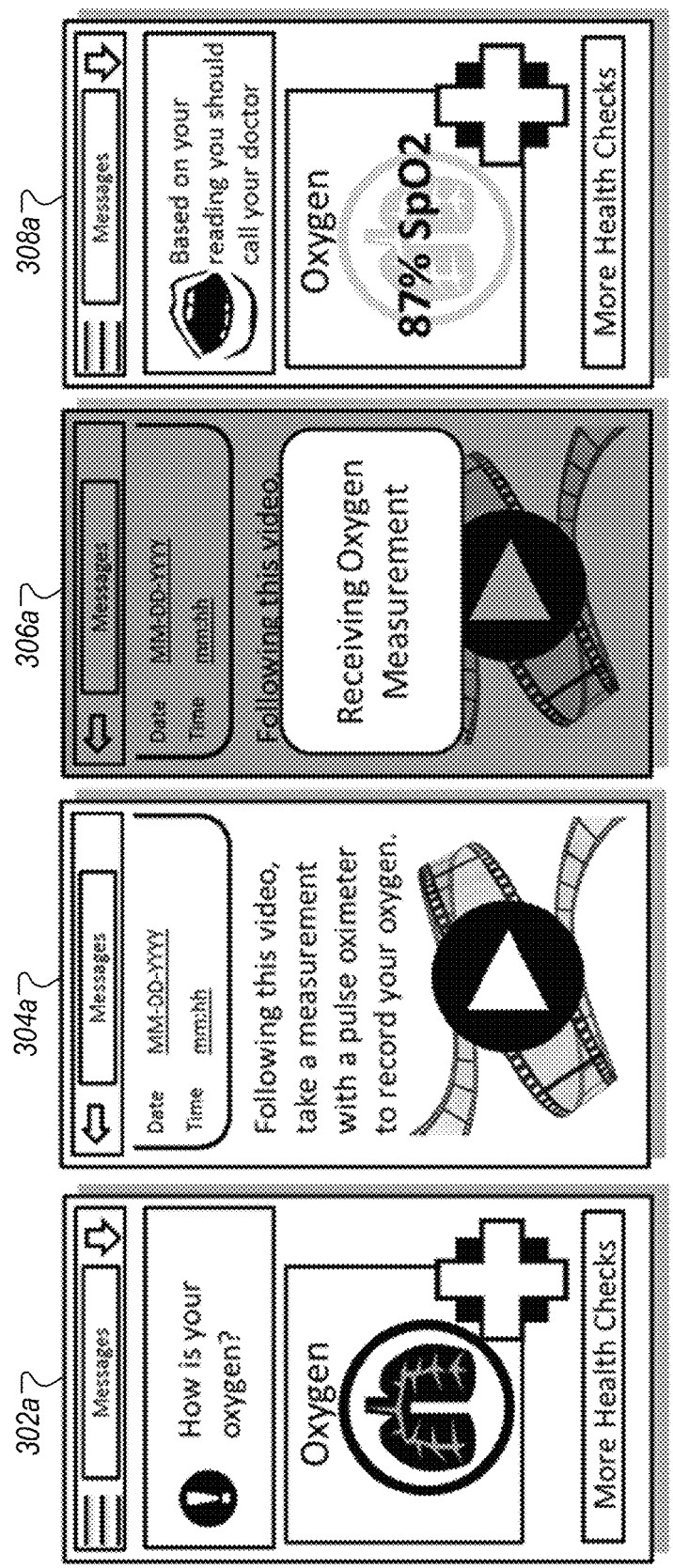
Figure 3B:
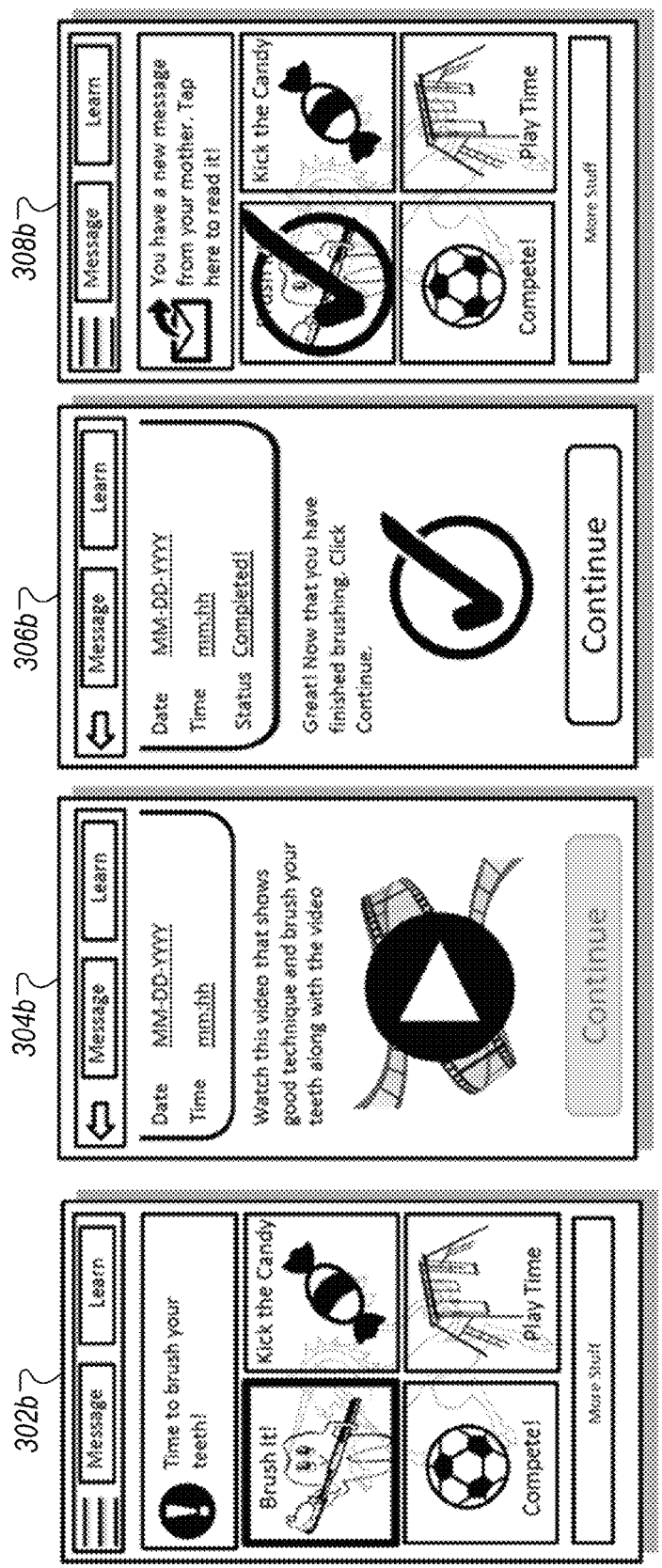
Figure 3C:
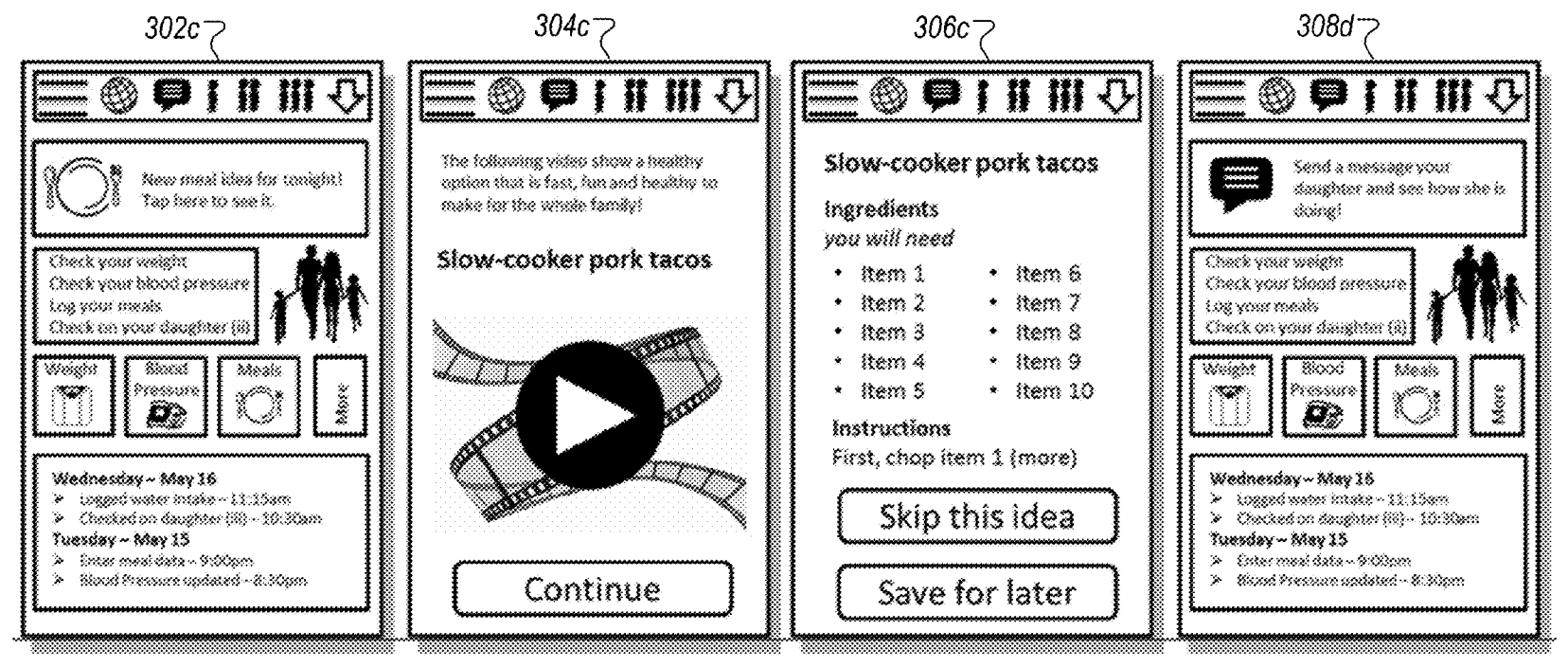

FIGS. 3A-3C are diagrams that illustrate examples of dynamically reconfigured user interfaces. For instance, FIG. 3A depicts reconfigured interface views 302a, 304a, 306a, and 308a for a seventy-five-year-old male user that has been diagnosed with chronic obstructive pulmonary disease (COPD) and identified as having failing eye sight. FIG. 3B depicts reconfigured interface views 302b, 304b, 306b, and 308b for a seven-year-old girl that needs help managing daily tasks such as brushing teeth. FIG. 3C depicts reconfigured interface views 302c, 304c, 306c, and 308c for a thirty-five-year-old woman who is overweight and needs help managing meals and reinforcing healthy habits for her children.

The interfaces depicted in FIGS. 3A-3C depict substantially similar interface designs that have been reconfigured for different individual users using the interface reconfiguration operation as described in FIG. 1A.

Referring to FIG. 3A, the interface views 302a-308a include display features that are customized to help a user with visual impairment. For instance, the interface views 302a-308a include large fonts to assist user read text displayed on the interface. In addition, the layout of the home view 302a includes a simple layout based on determining that the user may have difficulty understanding the information displayed on the home view 302a. In addition, the largest badge on the home view 302a displays information related to oxygen consumption and health checks based on a user data indicating that the user has been diagnosed chronic obstructive pulmonary disease and may likely using the application 122 for recording periodic oxygen measurements.

In the example depicted in FIG. 3A, the user may perform an oxygen check by initially providing a user input over the "check" graphical element. This directs the user to the view 304a where the user is provided with instructions to operate a pulse oximeter to record an oxygen measurement and a video demonstration for how to measure oxygen for COPD conditions and log the measurement. The user can then provide a user input that indicates an oxygen saturation using a wireless pulse oximeter on the view 304a. The user is then be directed to a confirmation alert on the view 306a indicating that the application is presently recording the user input.

The view 308a can be configured based on the user input provided on the view 304a. For instance, in the example depicted in FIG. 3A, the view 308a includes an indication that the user may have exhausted too much oxygen based on the received oxygen measurement from the user. The view 308a can additionally include a customized message that recommends that the user contact a doctor because the oxygen measurement may indicate that the user may at risk.

Referring now to FIG. 3B, the interface views 302b-308b include display features such as graphical illustrations that are targeted for a younger age demographic. Compared to the interface views 302a-308a, the vocabulary used for messages that are directed to the user have been adjusted to the language understanding level for a seven-year-old girl. In addition, the layout of content in the home view 302b is organized to provide different activities based on a determination that the user may use the application for multiple purposes (e.g., cooking, playing games, completing homework, etc.), since many types of daily activities may contribute to a user's wellbeing.

In the example depicted in FIG. 3B, the user can provide a user input on the upper left badge on the home view 302b in response to receiving a notification indicating that it is time to brush her teeth. This directs the user to the view 304b where the user is provided with instructions to watch a video demonstration for techniques for brushing teeth for children. The can then provide a user input that indicates that the user has brushed her teeth. The user is then directed to a confirmation alert on the screen 306b indicating that the task of brushing teeth has been completed.

The view 308b can be configured based on the user input provide on the screen 306b. For instance, in the example depicted in FIG. 3B, the view 308b includes a graphic placed over the upper left badge indicating that the activity associated with the badge (e.g., brushing teeth) has been completed by the user. The view 308b can additionally include other badges that display graphics associated with other activities based on received user context and/or user input data.

Referring now to FIG. 3C, the interface views 302c-308c include display features that are customized for a user that is managing different types of activity data monitoring (e.g., weight, blood pressure, calories, etc.). For instance, the interface views 302c-302c includes an arrangement that maximizes the visualization of different types of data such that the user can concurrently monitor various types of information. In addition, the content arrangement on the home view 302c includes different types of information such as a notification for topics of interest (e.g., new meal ideas), task list for activities to be completed (e.g., checking weight, checking blood pressure, etc.), and a calendar for recording of upcoming and past events (e.g., logged water intake).

In the example depicted in FIG. 3C, the user may provide a user input on the notification for meal suggestions on the home view 302c. This directs the user to the view 304c where the user is provided with a video demonstration for how to cook a healthy meal option that is easy to make for the entire family. The user can then choose to continue to the view 306c where the user is provided with a list of ingredients and instructions and an option to either skip the meal suggestion or save the instructions for a later date. After selecting one of the options provides, the user is directed back to the view 308c.

The view 308c can be configured enable the user to enter health-related information based on the suggested meal. For instance, in the example depicted in FIG. 3C, the view 308c includes options to provide information related to weight, blood pressure, or meals. The view 308c can additionally include alerts for other activities related to the suggested meals such as providing a reminder to check in on a daughter on planned health habit tasks.

As shown in FIGS. 3A-3C, the interface reconstruction operation can be used to dynamically provide user-specific information for individual users such that each of the interfaces for the individual users not only displays different types of content, but includes different flows between interface views based on user behavior data and/or user input data. In addition, user information may be used to prioritize certain types of customization rules that are determined to be more relevant to an individual user. For example, in FIG. 3A, display of text is prioritized over the amount of information displayed due to the visual impediment of the user. In FIG. 3B, graphical representations are prioritized over the amount of written text to capture the attention of a younger user. Finally, in FIG. 3C, content arrangement is prioritized over accessibility to enable a user to more effectively manage multiple tasks. In this regard, the interface reconfiguration may not only be used to adjust information on a user interface based on user activity data, but also adjust techniques to visualize information based on user traits that are not usually captured within activity data (e.g., health-related impediments, user goals and/or motivations, etc.).

FIGS. 4A-4B are diagrams that illustrates examples of application architectures 400A-400B that can be used to dynamically reconfigure a user interface. For instance, FIG. 4A depicts an architecture 400A that utilizes interfaces that are constructed using Hypertext Markup Language (HTML), and FIG. 4B depicts an architecture 400B that utilizes interfaces that are constructed using JavaScript Object Notation (JSON).

In general, the architectures 400A and 400B enable data exchange between a server (e.g., the server 110) and a mobile application (e.g., the application 122) on a client device (e.g., the device 102) over networks 402a and 402b, which correspond to the network 105. The data exchange enables the mobile application to generate the reconfigured interface 102b for display on the client device. As described with respect to FIG. 1B, the server 110 perform analytics and decision logic operations to determine when to perform an interface reconfiguration operation and/or enable the selection of customization rules that configure the interface reconfiguration.

The architectures 400A and 400B can be alternative implementations for generating reconfigured interfaces in different application environments. For instance, the architecture 400A and 400B may be implemented based on considered one or more considerations such as, for example, performance, user speed requirements, compatibility with mobile operating systems, processing constraints of either the client device or the server, and/or verification capabilities.

Referring to FIG. 4A, the architecture 400A may include server data sources 404a, web services 406a, and data processing algorithms 408a that all operate over a network 402a. The network 402a can represent a cloud network such as the network 103 the enables communication between the server 110 and the device 102. The server data sources 404a can represent repositories that store personalized user information such as the personalized user model 126, as described with respect to FIG. 1C, for enrolled users.

The web services 406a can represent application components that can integrate Web-based applications using open standards over an Internet protocol backbone such as, for example, Extensible Markup Language (XML), Simple Object Access Protocol (SOAP), Web Service Definition Language (WSDL), or Universal Description, Discovery and Integration (UDDI). For example, XML can be used to tag personalized user data, SOAP can be used to transfer the user data to the client device, WSDL can be used for describing the services available and UDDI can be used for listing this services available. In this regard, the web services 406a can be used by the server 110 to share business logic, the server data sources 404a, and related processes through a programmatic interface across the network 103.

The data processing algorithms 408a can include computer-implemented protocols for processing, managing, and updating personalized user information within the server data sources 404a. For instance, the data processing algorithms 408a may specify a set of configurations that enables the web services 406a to process personalized user data stored within the server data sources 404a, and transmit the user data to the client device for rendering the reconfigured interface 102b.

The application 410a can represent a native application that is installed on the operating system of the client device (e.g., the device 102). The application 410a can be configured to operate a browser control 412a that utilizes a rendering engine to dynamically reconfigure the display of a HTML user interface 414a. For example, the browser control 412a may periodically receive data packets that include updated configurations for the user interface, recently submitted user form submissions, or other data processing information, from the server over the network 402a. In response, the browser control 412a may utilize the rendering engine to reconfigure the HTML user interface 414a such that the reconfigured interface is displayable to the user during the next session when a user accesses the application 410a. As depicted in FIG. 4A, the browser control can also receive information from local components of the client device (e.g., client side scripts 416a, camera plugin 418a, audio plugin 420a, a native plugin 422a) in order to reconfigure the display of the HTML user interface 414a.

Referring now to FIG. 4B, the server data sources 404b and the web services 406b may perform substantially similar functions as the server data sources 404a and the web services 406a as described with respect to FIG. 4A. In addition, instead of exchanging configuration information related to an HTML user interface, the web services 406b may exchange information related to a JSON user interface.

The application 410b can be a native application that is installed on the operating system of the client device (e.g., the device 102). A key difference between the application 410b and the application 410a is that the application 410b is capable of performing analytics and decision logic operations related to an interface reconfiguration operation using data processing algorithms 416b. In this regard, the application 410b can be capable of utilizing resources of the client device to dynamically perform interface reconfiguration on the client device using a dynamic user interface framework 414b. For example, the dynamic user interface framework 414b can correspond to the dynamic reconfiguration module 112 that is capable of operating on the client device. In such examples, a user interface may be reconfigured more frequently since analytics and decision logic operations associated with the interface reconfiguration operation is not dependent on connectivity to the server.

The application 410b may also store mobile user interface classes 412b that include objects to be used to a construct or reconstruct a reconfigured interface. For example, the dynamic user interface framework 414b may extract subsets of classes from the mobile user interface classes 412b once the display attributes for the reconfigured interface have been determined based on applying the data processing algorithms 416b to the personalized user data received from the server data sources 404b. The mobile operating system runtime 418b can include an execution model that enables the operation of the application 410b on the operating system of the client. In some instances, the mobile operating system runtime 418b can also perform support services for the application 410b.

Figure 5:
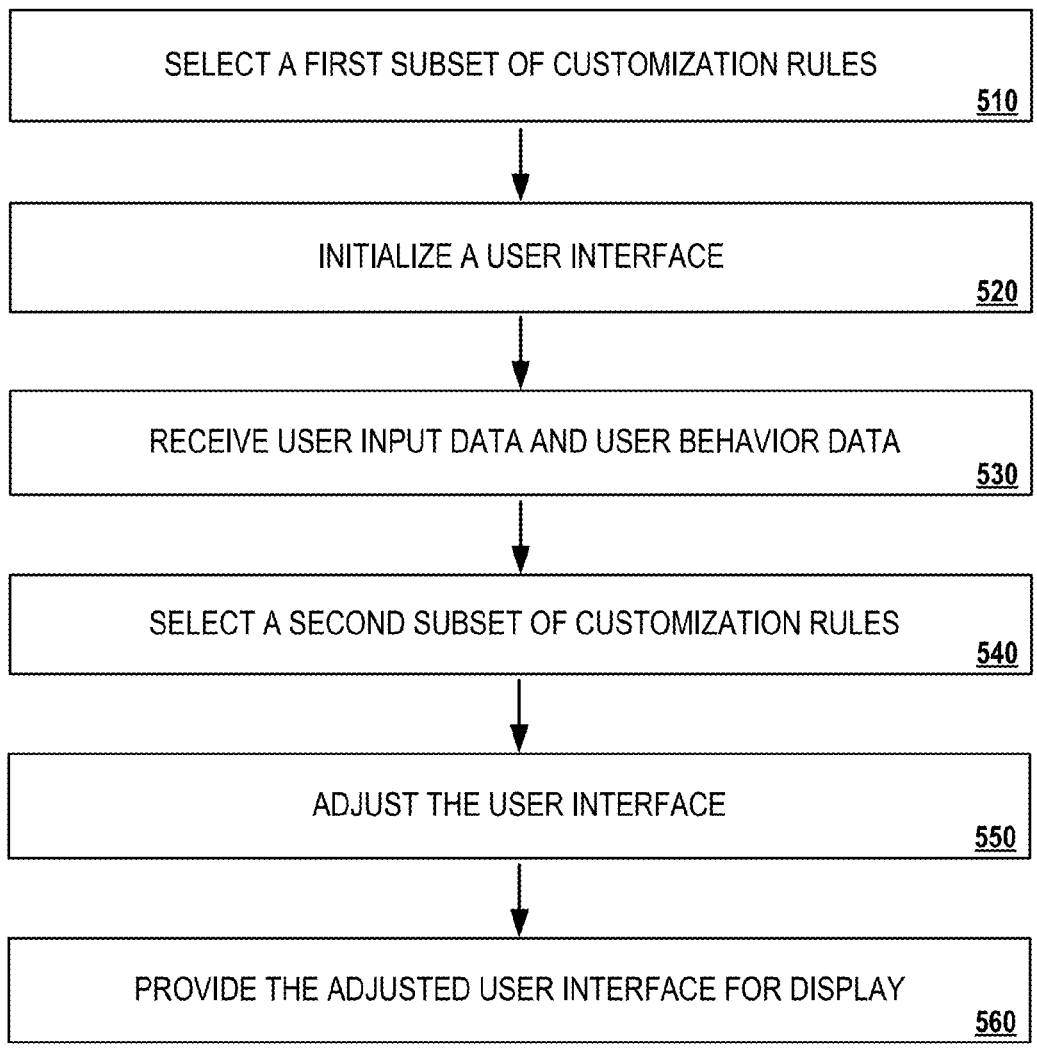
FIG. 5 is a flow diagram that illustrates an example of a process for dynamically reconfiguring a user interface.

FIG. 5 is a flow diagram that illustrates an example of a process 500 for dynamically reconfiguring a user interface. Briefly, the process 500 can include selecting a first subset of customization rules (510), initializing a user interface (520), receiving user input data and user behavior data (530), selecting a second subset of customization rules (540), adjusting the user interface (550), and providing the adjusted user interface for display (560).

In more detail, the process 500 may include selecting a first subset of customization rules (510). For instance, the dynamic reconfiguration module 112 may select a first subset of customization rules from among a predetermined set of customization rules associated with the application 122 on the device 102 during an initial enrollment process.

The process 500 may include initializing a user interface (520). For instance, the dynamic reconfiguration module 112 may generate the interface 102a based at least on the selected first set of customization rules.

The process 500 may include receiving user input data and user behavior data (530). For instance, after generating the interface 102a, the dynamic reconfiguration module 112 may receive the user input data 104 through the application 122 and the user behavior data 106 indicating a user context separate from interaction with the application 122.

The process 500 may include selecting a second subset of customization rules (540). For instance, the dynamic reconfiguration module 112 may select a second subset of customization rules based at least on the user input data 104 and the user behavior data 106. The selected second subset of customization rules can include one or more rules that are different from the first subset of customization rules. As discussed with respect to FIG. 2A, the second subset of customization rules can include formatting specifications 224a, visual specifications 224b, and engagement specifications 224c.

The process 500 may include adjusting the user interface (550). For instance, the dynamic reconfiguration module 112 may adjust the interface 102a according to the selected second subset of customization rules during an interface reconfiguration operation as described with respect to FIG. 1A. The adjusted interface 102a can represent the reconfigured interface 102b after completion of the interface reconfiguration operation.

The process 500 may include providing the adjusted user interface for display (560). For instance, the dynamic reconfiguration module 112 may provide the reconfigured interface 102b to the application 122 for display on the device 102.

Figure 6:
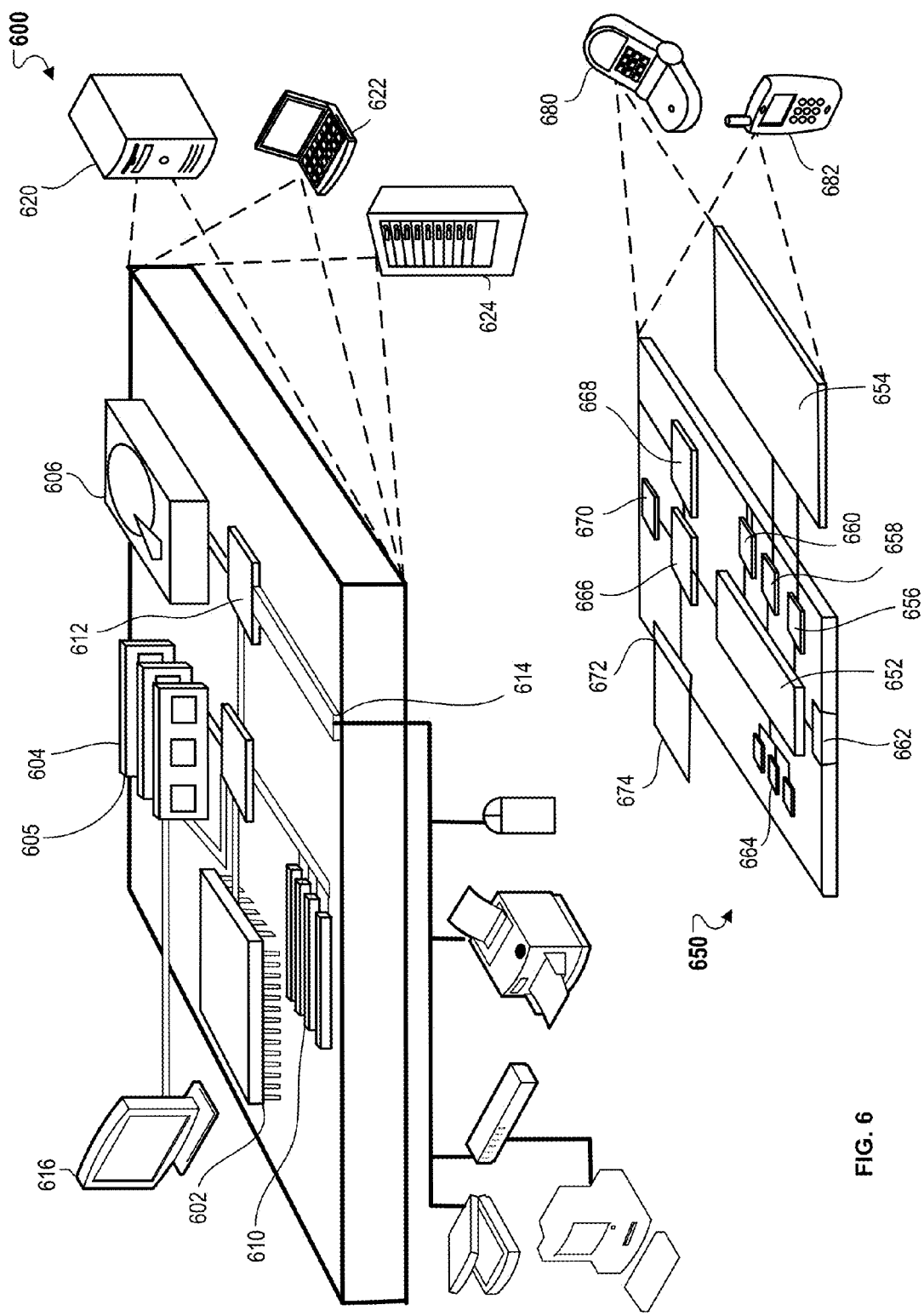
FIG. 6 is a block diagram of computing devices on which the processes described herein, or portions thereof, can be implemented.

FIG. 6 is a block diagram of computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed expansion port 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In one implementation, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which can accept various expansion cards (not shown). In the implementation, low-speed controller 612 is coupled to storage device 606 and low-speed expansion port 614. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes a processor 652, memory 664, and an input/output device such as a display 654, a communication interface 666, and a transceiver 668, among other components. The device 650 can also be provided with a storage device, such as a microdrive or other device, to provide additional storage. Each of the components 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. Additionally, the processor can be implemented using any of a number of architectures. For example, the processor 652 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 664 can also be provided and connected to device 650 through expansion interface 662, which can include, for example, a SIMM (Single In Line Memory Module) card interface. Such expansion memory 664 can provide extra storage space for device 650, or can also store applications or other information for device 650. Specifically, expansion memory 664 can include instructions to carry out or supplement the processes described above, and can include secure information also. Thus, for example, expansion memory 664 can be provide a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 664, or memory on processor 652 that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound, e.g., voice messages, music files, etc. and can also include sound generated by applications operating on device 650.

The computing device 650 can be implemented in a number of different forms, as shown in the figure. For example, it can be implemented as a cellular telephone 480. It can also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), Cloud Computing, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
receiving, by a server system, user enrollment data of a particular user from a user device of the particular user;
generating, by the server system, a user profile for the particular user based at least on the received user enrollment data;
selecting, by the server system and based at least on the user profile, a first subset of customization rules from among a set of customization rules associated with an application configured to operate on user devices, wherein the first subset of customization rules are selected by the server system for the particular user and do not represent user settings specified by the particular user;
providing, by the server system, user interface data specifying characteristics of a user interface of the application to the user device of the particular user, the characteristics of the user interface being determined by the server system based at least on the selected first subset of customization rules;
saving, by the server system, a first set of parameters that specifies the characteristics of the user interface determined by the server system based at least on the first subset of customization rules selected by the server system for the particular user; and
after providing the user interface data specifying the characteristics for the user interface to the user device of the particular user:
receiving, by the server system, (i) user interaction data indicating interaction of the particular user with the user device, (ii) application use data indicating a pattern of use of the application by the particular user over time, the application use data indicating a frequency or extent of use of the application by the user after the user interface data is provided, and (iii) sensor data from the user device of the particular user;
assigning, by the server system, priority scores to the user interaction data, the priority scores including a first priority score for user interaction data obtained at a first time and a second priority score for user interaction data obtained at a second time that is different than the first time;
without user input specifying a change in preferences, determining, by the server system, that the particular user would prefer a change in the user interface based on a difference between the first and second priority scores exceeding a threshold amount;

selecting, by the server system, a second subset of customization rules for the particular user based at least on the user interaction data, the sensor data, and the application use data indicating the frequency or extent of use of the application by the user after the user interface is provided, wherein the selected second subset of customization rules includes one or more customization rules that are different from the first subset of customization rules, and wherein the selected second subset of customization rules do not represent user settings specified by the particular user; and providing, by the server system and to the user device, updated user interface data that adjusts the user interface for the application based on (i) the saved first set of parameters that specifies the characteristics of the user interface determined by the server system based at least on the first subset of customization rules and (ii) the selected second subset of customization rules, wherein adjusting the user interface comprises:

in response to determining that that the particular user would prefer a change in the user interface, determining, by the server system and based on the second subset of customization rules, that a characteristic of the user interface having a current state should be changed; and providing, by the server system and to the user device, updated user interface data that gradually changes the characteristic from the current state to a second state over a series of multiple sessions of the application, wherein changing the characteristic comprises providing a different updated user interface for display in each of the multiple sessions, the updated user interface of each session having been adjusted so that the characteristic is incrementally closer to the second state than the updated user interface of the preceding session, wherein the updated user interface of each session of the multiple sessions is a combination of characteristics of the user interface of the preceding session, as specified by saved parameters describing the user interface of the preceding session, with characteristics determined using a respective subset of customization rules that is selected by the server system, from the set of customization rules associated with the application, based on user interaction data and sensor data generated during or subsequent to the preceding session.

2. The method of claim 1, wherein adjusting the user interface comprises altering content that is displayed on the user interface.

3. The method of claim 1, wherein adjusting the user interface comprises altering an arrangement of content that is displayed on the user interface.

4. The method of claim 1, wherein selecting the second subset of customization rules comprises:

comparing, by the server system, one or more portions of the received user interaction data, the application use data, and the sensor data to user enrollment data included in the user profile for the particular user;

ranking, by the server system, the one or more portions of the received user interaction data, the application use data, and the sensor data based at least on comparing the one or more portions of the received user interaction data, the application use data, and the sensor data to the user enrollment data included in the user profile for the particular user; and selecting, by the server system, the second subset of customization rules based at least on the highest ranked portion of the received user interaction the application use data, and the sensor data.

5. The method of claim 4, wherein: the received application use data indicates user behavior of the particular user through user interface of the application, and ranking the one or more portions of the received user interaction data, the application use data, and the sensor data further comprises:

determining a correspondence between the one or more portions of the received sensor data and the received application use data;

computing a score for each of the one or more portions of the received user interaction data based at least on the determined correspondence between the one or more portions of the received sensor data and the received application use data; and adjusting the rank for the one or more portions of the received user interaction data, the application use data, and the sensor data based at least on the value of the computed score for each of the one or more portions of the received user interaction data.

6. The method of claim 1, wherein selecting the first subset of customization rules from among the set of customization rules associated with the application comprises:

selecting, by the server system, the first subset of customization rules from among a predetermined set of customization rules that each (i) specify one or more adjustments or properties to apply to a user interface and (ii) specify one or more triggers or conditions associated with the user interaction data, the application use data, and the sensor data, wherein satisfaction of the one or more triggers or conditions causes the server system to provide the updated user interface data to the user device.

7. The method of claim 1, further comprising:

determining, by the server system, a context of the user device based on the user interaction data, the application use data, and the sensor data received from the user device;

selecting, by the server system and from among a set of context rules, a context rule corresponding to the determined context of the user device; and wherein the updated user interface data adjusts the user interface for the application based on the context rule corresponding to the determined context of the user device.

8. The method of claim 1, wherein the selected second subset of customization rules specify a future point in time for changing the characteristic from the current state to the second state.

9. The method of claim 1, further comprising:

determining, by the server system and based at least on the received user interaction data, the received sensor data, and the application use data, a predicted user context for the particular user corresponding to a future point in time, the predicted user context being different from a current user context of the particular user; and providing, by the server system and prior to the future point in time, the updated user interface data that adjusts the user interface for the application according to one or more customization rules that are associated with the predicted user context.

10. The method of claim 9, wherein the first subset of customization rules is associated with a prior user context determined for the particular user, and the second subset of customization rules is associated with the predicted user context for the particular user.

11. The method of claim 1, further comprising generating, by the server system, an adjusted user profile for the particular user based at least on the received user interaction data, the sensor data, and the application use data;
wherein the adjusted user profile includes one or more updated prioritization scores that reflect current preferences of the particular user for the user interface based on previously received user interaction data, and wherein the method further comprises:
selecting a third subset of customization rules based on the updated prioritization scores, wherein the selected third subset of customization rules includes one or more customization rules that specify an adjustment to a previously adjusted feature of the application; and
providing, by the server system and to the user device, updated user interface data that adjusts the user interface for the application based on the selected third subset of customization rules.

12. The system of claim 1, wherein the updated user interfaces for the multiple sessions of the application alter the application interface to have characteristics that are increasingly different from user-selected interface characteristics selected by the particular user.

13. A system comprising:
one or more computers of a server system; and
one or more storage devices storing instructions that, when executed by the one or more computers of the server system, cause the one or more computers of the server system to perform operations comprising:
receiving, by the server system, user enrollment data of a particular user from a user device of the particular user;
generating, by the server system, a user profile for the particular user based at least on the received user enrollment data;
selecting, by the server system and based at least on the user profile, a first subset of customization rules from among a set of customization rules associated with an application configured to operate on user devices, wherein the first subset of customization rules are selected by the server system for the particular user and do not represent user settings provided by the particular user;
providing, by the server system, user interface data specifying characteristics of a user interface of the application to the user device of the particular user, the characteristics of the user interface being determined by the server system based at least on the selected first subset of customization rules;
saving, by the server system, a first set of parameters that specifies the characteristics of the user interface determined by the server system based at least on the first subset of customization rules selected by the server system for a particular user; and
after providing the user interface data specifying the characteristics for the user interface to the user device of the particular user:
receiving, by the server system, (i) user interaction data indicating interaction of the particular user with the user device, (ii) application use data indicating a pattern of use of the application by the particular user over time, the application use data indicating a frequency or extent of use of the application by the user after the user interface data is provided, and (iii) sensor data from the user device of the particular user;
assigning, by the server system, priority scores to the user interaction data, the priority scores including a first priority score for user interaction data obtained at a first time and a second priority score for user interaction data obtained at a second time that is different than the first time;
without user input specifying a change in preferences, determining, by the server system, that the particular user would prefer a change in the user interface based on a difference between the first and second priority scores exceeding a threshold amount;
selecting, by the server system, a second subset of customization rules for the particular user based at least on the user interaction data, the sensor data, and the application use data indicating the frequency or extent of use of the application by the particular user after the user interface is provided, wherein the selected second subset of customization rules includes one or more customization rules that are different from the first subset of customization rules, wherein the second subset of customization rules do not represent user settings specified by the particular user; and
providing, by the server system and to the user device, updated user interface data that adjusts the user interface for the application based on (i) the saved first set of parameters that specifies the characteristics of the user interface determined by the server system based at least on the first subset of customization rules and (ii) the selected second subset of customization rules, wherein adjusting the user interface comprises:
in response to determining that that the particular user would prefer a change in the user interface, determining, by the server system and based on the second subset of customization rules, that a characteristic of the user interface having a current state should be changed; and
providing, by the server system and to the user device, updated user interface data that gradually changes the characteristic from the current state to a second state over a series of multiple sessions of the application, wherein changing the characteristic comprises providing a different updated user interface for display in each of the multiple sessions, the updated user interface of each session having been adjusted so that the characteristic is incrementally closer to the second state than the updated user interface of the preceding session,
wherein the updated user interface of each session of the multiple sessions is a combination of characteristics of the user interface of the preceding session, as specified by saved parameters describing the user interface of the preceding session, with characteristics determined using a respective subset of customization rules that is selected by the server system, from the set of customization rules associated with the application, based on user interaction data and sensor data generated during or subsequent to the preceding session.

14. The system of claim 13, wherein the operations further comprise:

generating, by the server system, an adjusted user profile for the particular user based at least on the received user interaction data, the application user data, and the sensor data.

15. The system of claim 13, wherein selecting the second subset of customization rules comprises:
comparing, by the server system, one or more portions of the received user interaction data, the application use data, and the sensor data to user enrollment data included in the user profile for the particular user;
ranking, by the server system, the one or more portions of the received user interaction data, the application use data, and the sensor data based at least on comparing the one or more portions of the received user interaction data, the application use data, and the sensor data to the user enrollment data included in the user profile for the particular user; and
selecting, by the server system, the second subset of customization rules based at least on the highest ranked portion of the received user interaction the application use data, and the sensor data.

16. The system of claim 15, wherein:
the received application use data indicates user behavior of the particular user through user interface of the application, and
ranking the one or more portions of the received user interaction data, the application use data, and the sensor data further comprises:
determining a correspondence between the one or more portions of the received sensor data and the received application use data;
computing a score for each of the one or more portions of the received user interaction data based at least on the determined correspondence between the one or more portions of the received sensor data and the received application use data; and
adjusting the rank for the one or more portions of the received user interaction data, the application use data, and the sensor data based at least on the value of the computed score for each of the one or more portions of the received user interaction data.

17. The system of claim 13, wherein selecting the first subset of customization rules from among the set of customization rules associated with the application comprises:
selecting, by the server system, the first subset of customization rules from among a predetermined set of customization rules that each (i) specify one or more adjustments or properties to apply to a user interface and (ii) specify one or more triggers or conditions associated with the user interaction data, the application use data, and the sensor data, wherein satisfaction of the one or more triggers or conditions causes the server system to provide the updated user interface data to the user device.

18. They system of claim 13, wherein the operations further comprise:
determining, by the server system, a context of the user device based on the user interaction data, the application use data, and the sensor data received from the user device;
selecting, by the server system and from among a set of context rules, a context rule corresponding to the determined context of the user device; and
wherein the updated user interface data adjusts the user interface for the application based on the context rule corresponding to the determined context of the user device.

19. The system of claim 13, further comprising:
receiving, from a third-party system, electronic medical records for the user that indicate a care plan set by a physician for the user;
wherein the user interface data or the updated user interface data is generated based on content of the electronic medical records for the user.

20. The system of claim 19, wherein the additional adjusted user interface is generated based on historical medical information including genome matching data, family histories, or immunization records.

21. A non-transitory computer-readable storage device encoded with computer program instructions that, when executed by one or more computers, cause the one or more computers to perform operations comprising:
receiving, by a server system, user enrollment data of a particular user from a user device of the particular user;
generating, by the server system, a user profile for the particular user based at least on the received user enrollment data;
selecting, by the server system and based at least on the user profile a first subset of customization rules from among a set of customization rules associated with an application configured to operate on user devices, wherein the first subset of customization rules are selected by the server system for the particular user and do not represent user settings specified by the particular user;
providing, by the server system, user interface data specifying characteristics of a user interface of the application to the user device of the particular user, the characteristics of the user interface being determined by the server system based at least on the selected first subset of customization rules;
saving, by the server system, a first set of parameters that specifies the characteristics of the user interface determined by the server system based at least on the first subset of customization rules selected by the server system for the particular user; and
after providing the user interface data specifying the characteristics for the user interface to the user device of the particular user:
receiving, by the server system, (i) user interaction data indicating interaction of the particular user with the user device, (ii) application use data indicating a pattern of use of the application by the particular user over time, the application use data indicating a frequency or extent of use of the application by the user after the user interface data is provided, and (iii) sensor data from the user device of the particular user;
assigning, by the server system, priority scores to the user interaction data, the priority scores including a first priority score for user interaction data obtained at a first time and a second priority score for user interaction data obtained at a second time that is different than the first time:
without user input specifying a change in preferences, determining, by the server system, that the particular user would prefer a change in the user interface based on a difference between the first and second priority scores exceeding a threshold amount;
selecting, by the server system, a second subset of customization rules for the particular user based at least on the user interaction data, the sensor data, and the application use data indicating the frequency or extent of use of the application by the user after the user interface is provided, wherein the selected second subset of customization rules includes one or more customization rules that are different from the first subset of customization rules, and wherein the selected second subset of customization rules do not represent user settings specified by the particular user; and providing, by the server system and to the user device, updated user interface data that adjusts the user interface for the application based on (i) the saved first set of parameters that specifies the characteristics of the user interface determined by the server system based at least on the first subset of customization rules and (ii) the selected second subset of customization rules, wherein adjusting the user interface comprises:

in response to determining that that the particular user would prefer a change in the user interface, determining, by the server system and based on the second subset of customization rules, that a characteristic of the user interface having a current state should be changed; and providing, by the server system and to the user device, updated user interface data that gradually changes the characteristic from the current state to a second state over a series of multiple sessions of the application, wherein changing the characteristic comprises providing a different updated user interface for display in each of the multiple sessions, the updated user interface of each session having been adjusted so that the characteristic is incrementally closer to the second state than the updated user interface of the preceding session, wherein the updated user interface of each session of the multiple sessions is a combination of characteristics of the user interface of the preceding session, as specified by saved parameters describing the user interface of the preceding session, with characteristics determined using a respective subset of customization rules that is selected by the server system, from the set of customization rules associated with the application, based on user interaction data and sensor data generated during or subsequent to the preceding session.

* * * * *

UNITED STATES PATENT AND TRADEMARK OFFICE
CERTIFICATE OF CORRECTION

PATENT NO. : 9,983,775 B2
APPLICATION NO. : 15/067046
DATED : May 29, 2018
INVENTOR(S) : Praduman Jain and Josh Schilling Page 1 of 1

It is certified that error appears in the above-identified patent and that said Letters Patent is hereby corrected as shown below:

In the Specification

At Column 1, Line 3, after the title, please insert the following section:
-- GOVERNMENT LICENSE RIGHTS
This invention was made with government support under grant number HHSN261201300056C awarded by the National Institutes of Health. The government has certain rights in the invention. --.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*